(12) United States Patent
Wilkinson et al.

(10) Patent No.: US 10,853,805 B2
(45) Date of Patent: Dec. 1, 2020

(54) DATA PROCESSING SYSTEM UTILISING DISTRIBUTED LEDGER TECHNOLOGY

(71) Applicant: Freeformers Holdings Limited, London (GB)

(72) Inventors: Anthony John Wilkinson, London (GB); Arjuna Gihan Fernando, London (GB)

(73) Assignee: Freeformers Holdings Limited, London (GB)

( * ) Notice: Subject to any disclaimer, the term of this patent is extended or adjusted under 35 U.S.C. 154(b) by 0 days.

(21) Appl. No.: 16/368,610

(22) Filed: Mar. 28, 2019

(65) Prior Publication Data

US 2019/0333056 A1 Oct. 31, 2019

(30) Foreign Application Priority Data

Apr. 25, 2018 (EP) .................................... 18169341

(51) Int. Cl.
*G06Q 40/00* (2012.01)
*G06Q 20/38* (2012.01)

(52) U.S. Cl.
CPC .......... *G06Q 20/389* (2013.01); *G06Q 40/00* (2013.01); *G06Q 20/3827* (2013.01); *G06Q 2220/00* (2013.01)

(58) Field of Classification Search
CPC .. G06Q 40/00; G06Q 20/389; G06Q 2220/00; G06Q 20/3827
See application file for complete search history.

(56) References Cited

U.S. PATENT DOCUMENTS

| | | | | |
|---|---|---|---|---|
| 7,765,481 | B2 * | 7/2010 | Dixon .................... | G06Q 30/06 715/738 |
| 2008/0005006 | A1 * | 1/2008 | Tritt ....................... | G06Q 40/00 705/36 R |
| 2017/0011460 | A1 | 1/2017 | Molinari et al. | |
| 2017/0243209 | A1 | 8/2017 | Johnsrud et al. | |

OTHER PUBLICATIONS

Lael Brainard, The Use of Distributed Ledger Technologies in Payment, Clearing, and Settlement, Apr. 14, 2016, Institute of International Finance, web, 2-12 (Year: 2016).*

* cited by examiner

*Primary Examiner* — I Jung Liu
(74) *Attorney, Agent, or Firm* — EIP US LLP

(57) ABSTRACT

There is provided a data processing system comprising a plurality of computing nodes configured to host a distributed ledger, a computing device communicatively coupled with one of the computing nodes, and a data store communicatively coupled with the computing device. The distributed ledger comprises a plurality of user accounts, each of the plurality of user accounts having an address on the distributed ledger, and one or more asset contracts, each of the one or more asset contracts having an address on the distributed ledger. The computing device is operable to provide association data to a first asset contract of the one or more asset contracts, the provided association data comprising an address on the distributed ledger of a first user account of the one or more user accounts, and data indicative of a first data location in the data store. The first asset contract is arranged to store the provided association data, and in response to a query indicating the first user account, return the data indicative of the first data location, thereby to enable access to data stored at the first data location.

16 Claims, 23 Drawing Sheets

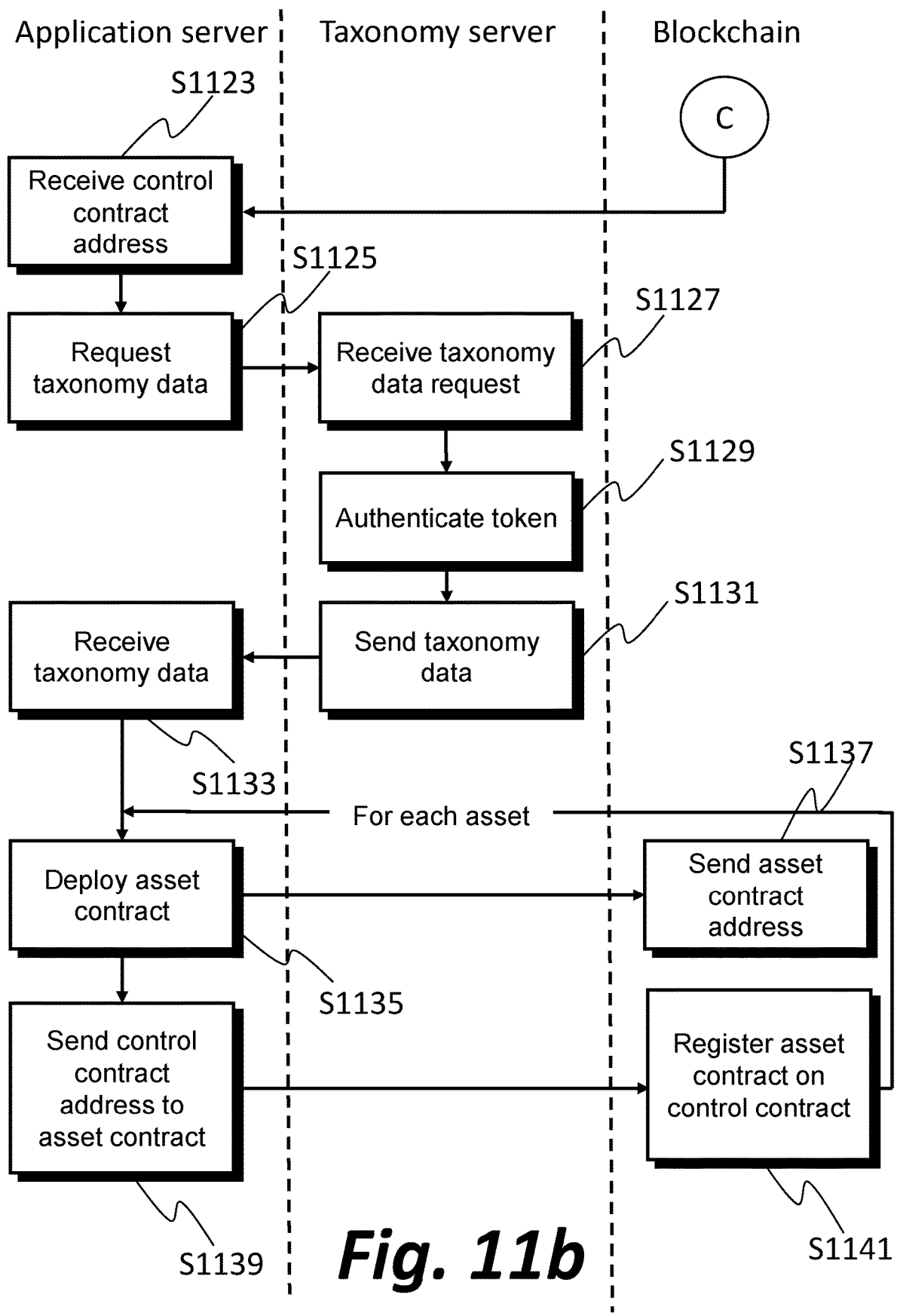

US 10,853,805 B2

DATA PROCESSING SYSTEM UTILISING DISTRIBUTED LEDGER TECHNOLOGY

CROSS-REFERENCE TO RELATED APPLICATIONS

This application claims priority to EP Application No. EP18169341.7, filed Apr. 25, 2019, under 35 U.S.C. § 119(a). The above-referenced patent application is incorporated by reference in its entirety.

BACKGROUND OF THE INVENTION

A distributed ledger is an electronic ledger in which stored data is replicated between nodes of a network. A blockchain is an example of a type of distributed ledger. Distributed ledgers, and blockchains in particular, employ decentralised trust mechanisms which negate the need for a central administrator or centralised data storage, which have resulted in distributed ledgers being employed as ledgers for cryptocurrencies.

In addition to cryptocurrency platforms, more sophisticated distributed ledger platforms have emerged. Such platforms allow for smart contracts to be deployed on a distributed ledger. Smart contracts executed code in response to receiving a transaction from a user account, or a message from another smart contract on the distributed ledger. The execution of smart contract code can cause changes to the state of the distributed ledger. In the example of a blockchain, these changes of state are encoded within blocks of the blockchain, and effectively become immutable by virtue of the decentralised trust mechanism of the blockchain. Examples of blockchain platforms on which smart contracts can be deployed are the Ethereum platform and various Hyperledger platforms.

It is claimed that the Ethereum blockchain platform is Turing-complete, such that in principle, smart contracts may be programmed to solve any reasonable computing problem, provided that sufficient computing resources (for example, memory) are available. In order to avoid abuses of computational resources by poorly- or maliciously-programmed smart contracts (for example, smart contracts with code that results in infinite loops), a transaction or message that causes an Ethereum smart contract to run code must be accompanied by a transfer of cryptocurrency referred to as Ether. In particular, if a user sends a request to a smart contract that will result in a change to the state of the blockchain, the user must send Ether from a user account to the smart contract in order for the transaction to be stored on the blockchain. By contrast, if a user sends a request to a smart contract that will not result in a change to the state of the blockchain (referred to as a constant method), Ether may not be required.

Many distributed ledgers are public, such that any network user may request a user account and thereby participate in the operation of the distributed ledger. Due to typically large numbers of users, decentralised trust in public distributed ledgers can be very reliable. Data stored on public distributed ledgers may be accessed by any network user. An example of a public distributed ledger is the Ethereum main chain.

Distributed ledgers may also be hosted on private networks, such that users must be able to access the private network in order to participate in the operation of the distributed ledger. In some cases, the nodes of a private distributed ledger are operated by a single entity, such as a corporate entity, resulting in de facto centralised trust. Private distributed ledgers are often used for testing smart contracts before deploying equivalent smart contracts on a public distributed ledger. For example, a private Ethereum-based blockchain may be used to test smart contracts that will later be deployed on the Ethereum main chain.

SUMMARY

According to various aspects of the present invention, there are provided systems and methods for storing and processing data, in accordance with the appended claims. Further features and advantages of the invention will become apparent from the following description of preferred embodiments of the invention, given by way of example only, which is made with reference to the accompanying drawings.

BRIEF DESCRIPTION OF THE DRAWINGS

FIGS. 11a and 11b is a flow diagram representing a routine for deploying a control contract on a blockchain.

DETAILED DESCRIPTION OF CERTAIN INVENTIVE EMBODIMENTS

Public Chain System

Figure 1:
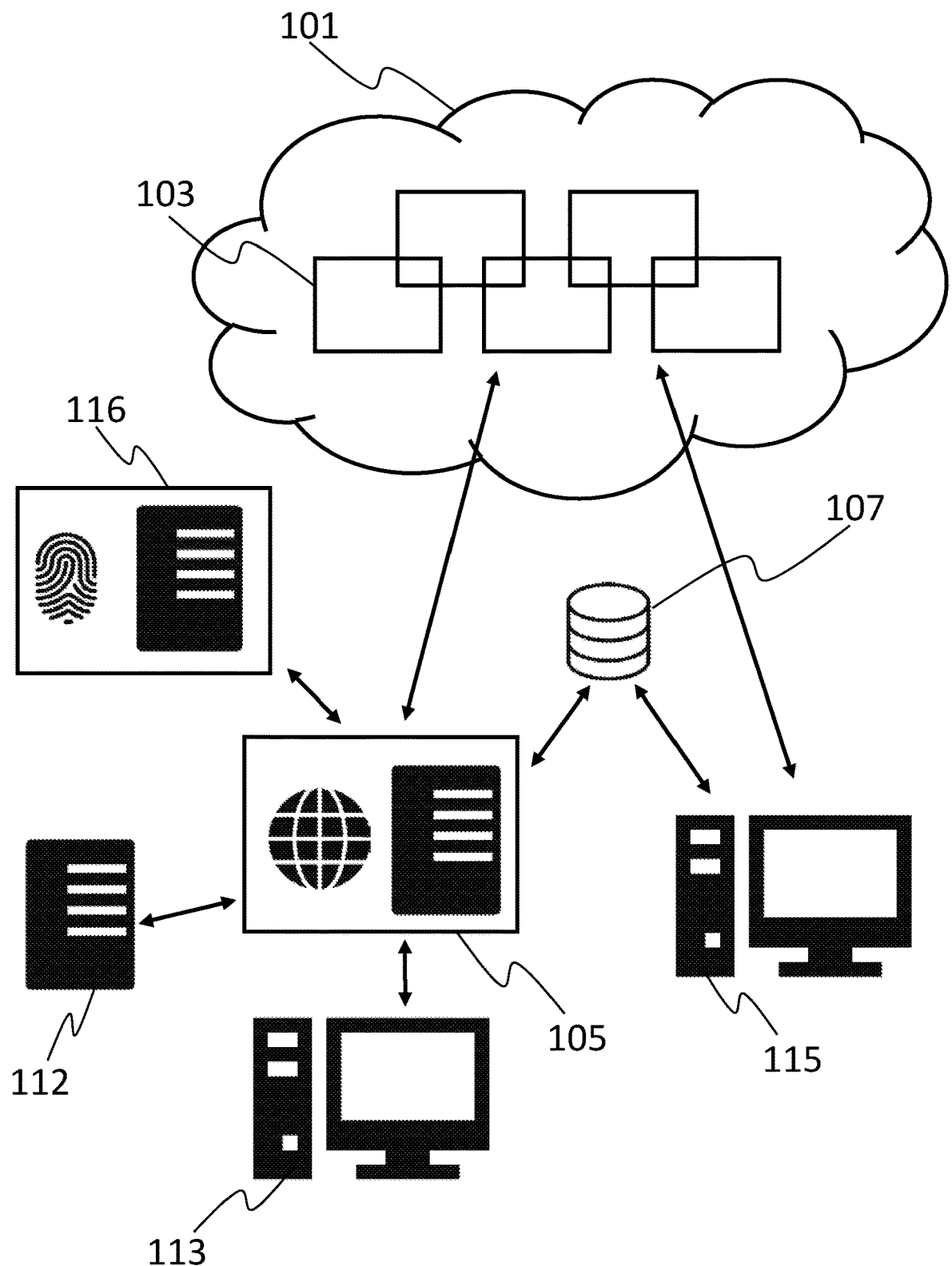
FIG. 1 is a schematic diagram of a system for storing and processing data on a public blockchain.

There is provided a system for storing and processing data on a distributed ledger. The distributed ledger comprises user accounts and smart contracts referred to as asset contracts, each asset contract corresponding to an asset with which a user can be associated. In one example, an asset is an attribute of an individual, for example an attribute that the individual has demonstrated in a workplace scenario. An asset contract is arranged to store association data, the association data associating a user account with evidence data stored in a data store, the evidence data indicating that the user is associated with the asset. In response to a request indicating the user account, the asset contract is arranged to return data indicative of a data location in the data store at which the evidence data is stored. In this way, users may query the asset contract and retrieve the evidence data from the data store, in order to be able to verify whether or not the user is entitled to be associated with the asset.

In some examples, a user associated with a user account on the distributed ledger may be permitted to certify association data, whereby to verify that the evidence data is genuine and entitles an individual to be associated with an asset. In such a scenario, the user performing the certification is referred to as a witness. In some examples, certifying the association data involves the witness retrieving the data from the data location indicated by the association data, and if satisfied by the retrieved evidence data, sending a request to the asset contract to update the association data to indicate that the association data is certified. In a similar routine, a user may revoke a certification of association data if the user believes that the certification was inappropriately issued.

In order for a user to be permitted to act as a witness and certify evidence, the user may be required to have specific privileges and/or a minimum trust level. A trust level is a value assigned to a user that allows the user to perform certain actions on the distributed ledger, such as certifying evidence data or revoking a certification of evidence data, as will be described hereafter. In order to manage these trust levels, in some examples the distributed ledger further comprises another smart contract, referred to as a control contract, storing trust level data indicative of trust levels of users. During a routine in which a user attempts to certify association data stored by an asset contract, the asset contract sends a message to the control contract, requesting the trust level of the user. The asset contract then compares the trust level of the user with minimum required trust level for the asset contract in order to determine whether the user is permitted to act as a witness and certify the association data.

Associating trust levels with user accounts on a distributed ledger must be performed by a user with sufficient privileges. In some examples, a user may have privileges with respect to a particular asset contract, and may be able to associate an asset-specific trust level with a user account for that particular asset contract. In other examples, a single entity may be responsible for adjusting global trust levels that apply to multiple asset contracts. Associating trust levels with user accounts contrasts with the ethos of typical applications of distributed ledgers, which aim to replace centralised trust completely with a decentralised trust model. In this example, decentralised trust is retained regarding transactional changes to the state of the distributed ledger, but centrally-managed trust levels and privileges are employed with respect to specific actions, for example the action of certifying association data. In other examples, trust levels may be acquired according to a decentralised trust model—for example users having sufficiently high trust levels may be permitted to increase a trust level of another user.

FIG. 1 shows an example of a system for storing and processing data in accordance with the present invention.

The system includes a public network 101. In this example, the public network 101 is the Internet. The public network 101 contains computing devices acting as nodes to host a public distributed ledger 103 (referred to hereafter as the public blockchain 103). The public blockchain 103 in this example is the Ethereum main chain.

The system of FIG. 1 includes multiple user devices, including first user device 113 and second user device 115. In this example, first user device 113 and second user device 115 are desktop computers. Other user devices may be laptop computers, tablet computers, smart phones, or any other type of user device capable of communicating with an application server, for example using HyperText Transfer Protocol Secure (HTTPS). First user device 113 is configured to communicate with an application server 105. In some implementations of the present example, the application server is a cloud-hosted virtual application server, for example a virtual application server provided by Amazon Web Services® (AWS). In other implementations, the off-site application server 105 is a physical server. The application server 105 is further configured to communicate with an evidence store 107, a taxonomy server 112, and an Identity Provider (IdP) 116.

The application server 105 provides an application interface to first user device 113, and is configured to communicate with nodes of the public blockchain 103 by means of exchanging Remote Procedure Call (RPC) requests and responses. In this example, the application server 105 uses the Ethereum JSON-RPC-2.0 protocol to communicate with nodes of the public blockchain 103. The Ethereum JSON-RPC-2.0 protocol provides a data-efficient communication mechanism that is suitable for invoking methods on an Ethereum-based blockchain.

The application server 105 provides access management services on behalf of the users, including the user of first user device 113, which include managing Ethereum key pairs for users, and requesting and authenticating access tokens from the IdP 116. In this example, access tokens are used to provide identity information to network entities such as the taxonomy server 112 on behalf of users, including the user of first user device 113. The IdP 116 stores a list of users associated with accounts on the public blockchain 103, along with blockchain addresses of the associated accounts. In this example, the IdP 116 is hosted by a separate server. In other examples, an IdP is hosted by an application server providing access management services. The application server 105 is operable to deploy contracts on the public blockchain 103, and to make transactional changes to contracts stored on the public blockchain 103, as will be described in detail hereafter.

One function of the application server 105 is to deploy a control contract on the public blockchain 103 on behalf of a user. A user who deploys a control contract is referred to as the owner of the control contract. The owner of a control contract is the only user permitted to perform certain actions. For example, subsequently to deploying the control contract, the owner may deploy asset contracts to be controlled by the control contract, as will be described in more detail hereafter. The owner may also register user accounts of new users with the control contract. In this example, registering a user account with the control contract includes storing identity verification data corresponding to a new user on the control contract. In this example, identity verification data includes a hash of identity data derived from identity materials provided by the new user, for example a passport number.

In this example, the owner may also alter global and asset-specific trust levels associated with user accounts, along with other privileges such as the right to request certification of evidence data (canRequest), the right to certify evidence data (canWitness) or the right to revoke certifications of evidence data (canRevoke), each of which will be described in detail hereafter.

The application server 105 maintains an Ethereum wallet such that Ether may be provided when the application server 105 makes transactional changes to contracts stored on the public blockchain 103. The Ethereum wallet is associated with a blockchain address of an account controlled by the owner of the control contract.

As mentioned above, the application server 105 is also configured to communicate with the evidence store 107. In this example, the evidence store 107 includes a virtual data store provided by AWS, and is further connected to a node of a distributed data store configured using the InterPlanetary File System (IPFS) protocol. In this example, the node of the distributed data store is operated by the operator of the application server 105. The skilled person will appreciate that this allows the operator of the application server 105 to maintain evidence data in the distributed data store and to prevent it from being lost. In further examples, an evidence store may not be connected to a node of a distributed data store. In further examples still, an evidence store includes a local server and a local database.

The application server 105 communicates with a taxonomy server 112, which provides taxonomy services that include maintaining additional metadata corresponding to asset contracts, including a hierarchy of assets, as will be described in more detail hereafter. The taxonomy server 112 in this example is a GraphQL server.

Second user device 115 is configured with a browser-based Decentralised Application (DApp), which communicates with nodes of the public blockchain 103 using the Ethereum JSON-RPC-2.0 protocol. Second user device 115 is further configured to communicate with the evidence store 107. Second off-site user device 115 performs access management locally using a locally-managed wallet containing an Ethereum key pair and having associated Ether.

Figure 2:
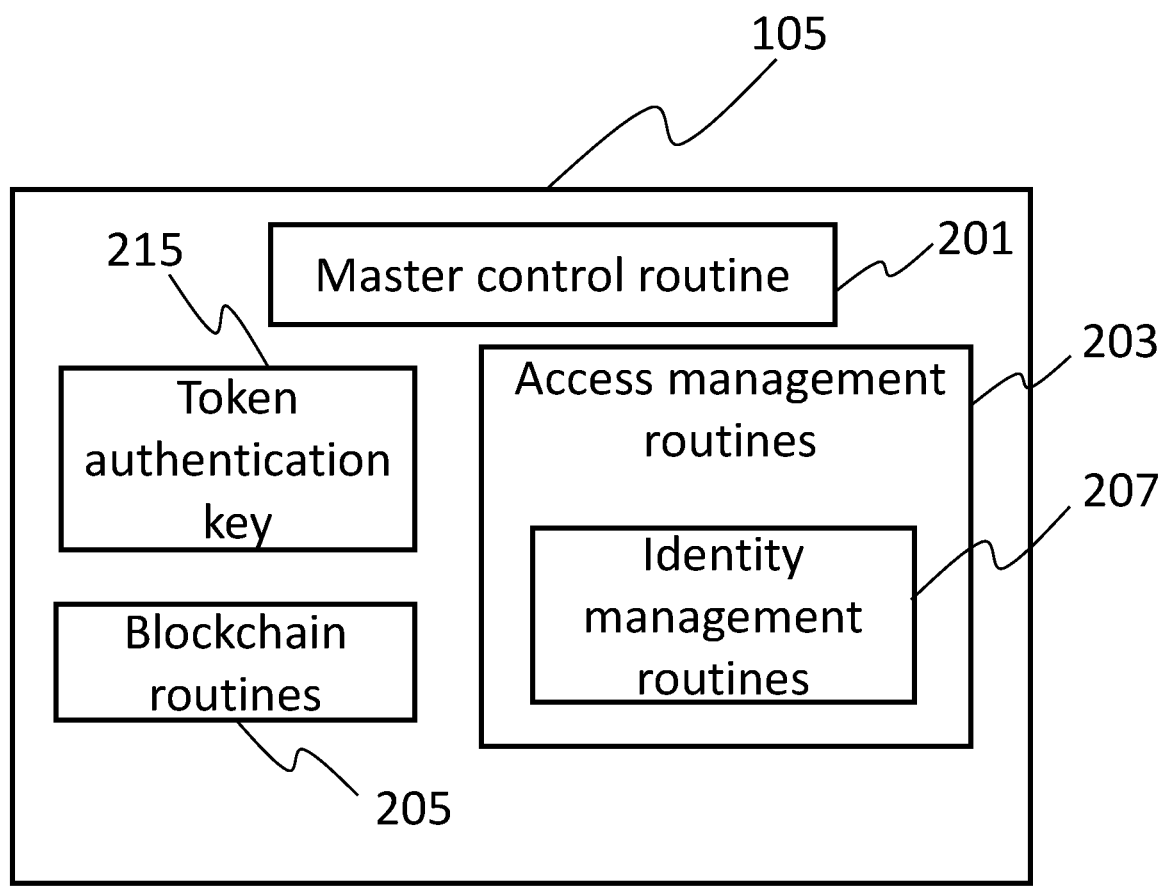
FIG. 2 is a block diagram representing an application server in the system of FIG. 1.

As shown in FIG. 2, the application server 105 stores a master control routine 201. The master control routine 201 is configured to call subroutines including access management routines 203 and blockchain routines 205. The access management routines 203 include identity management routines 207. The master control routine 201 calls the identity management routines 207 in order to request and authenticate access tokens from the IdP 116, and calls the blockchain routines 205 in order to invoke methods on the public blockchain 103. The application server 105 further stores a token authentication key 215, which is used for authenticating access tokens received from the IdP 116, as will be described hereafter.

Figure 3:
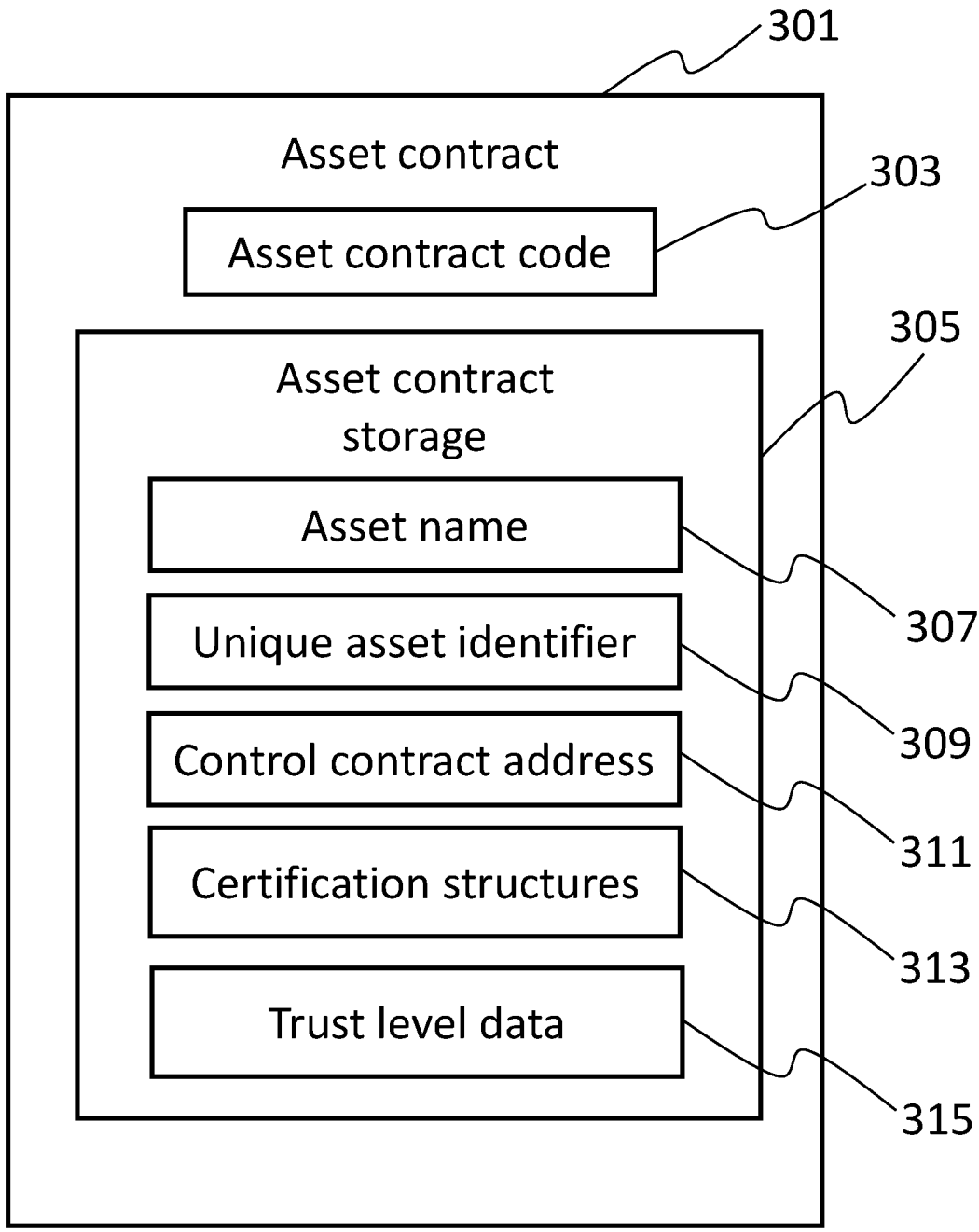
FIG. 3 is a block diagram representing an asset contract stored on the public blockchain of FIG. 1.

FIG. 3 shows an example of an asset contract 301 stored on the nodes of the public blockchain 103. The asset contract 301 contains asset contract code 303 and asset contract storage 305. The asset contract storage 305 includes an asset name 307, a unique asset identifier 309, and a blockchain address 311 of a control contract 401. The unique asset identifier 309 in this example is distinct from the asset name 307 and from the blockchain address of the asset contract 301, the significance of which will be discussed hereafter. The asset contract storage 305 further includes certification structures 313. Each of the certification structures 313 includes a blockchain address of a user. A certification structure corresponding to a user is updated when the user seeks certification of evidence indicating that the user is associated with the asset, and is further updated when a user is certified as being associated with the asset, as will be described in more detail hereafter.

The asset contract storage includes trust level data 315, which is indicative of minimum trust levels required by users to be able to perform methods on the asset contract. In this example, the asset contract has a cTrust level, which indicates a minimum cTrust level that must be assigned to a user for the user to be able to certify evidence relating to the asset, as will be described in more detail hereafter.

Figure 4:
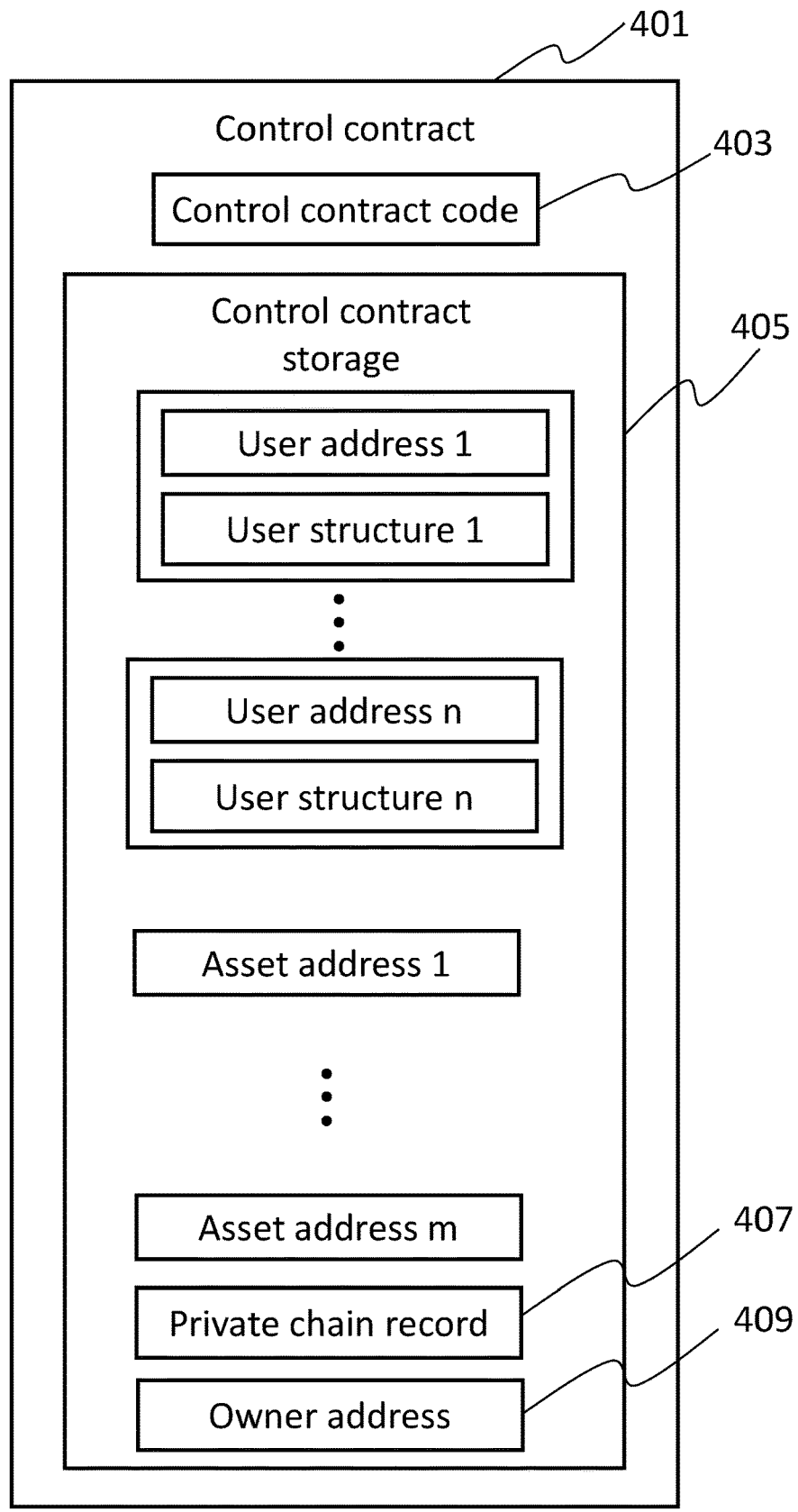
FIG. 4 is a block diagram representing a control contract stored on the public blockchain of FIG. 1.

FIG. 4 shows an example of a control contract 401 stored on the nodes of the public blockchain 103. The control contract 401 contains control contract code 403 and control contract storage 405. The control contract storage 405 includes, for users associated with accounts on the public blockchain 103, the blockchain address of the user account and an associated data structure for the user. The associated data structure for the user includes identity verification data, which in this example includes a hash of identity data provided by the user during an initial registration process. Identity data may include, for example, a passport number or a driving licence number for the user, along with other data such as the date of birth of the user. The associated data structure for the user also includes data indicative of global and asset-specific trust levels of the user. As described above, a trust level is a value assigned to a user that allows the user to perform certain actions on the public blockchain. In this example, the user has a global cTrust level and may also have asset-specific cTrust levels corresponding to certain assets. These cTrust levels of the user may be compared with a cTrust level of an asset as will be described in more detail hereafter. The associated data structure for each user may also include canRequest, canWitness, and canRevoke flags, which indicate that the user has the right to request certification of evidence data, to certify evidence data, and to revoke certifications of evidence data, respectively, as will be described hereafter.

The control contract storage 405 also includes, for each asset contract controlled by the control contract 401, the blockchain address of the asset contract. The control contract storage 405 further includes a record 407 of registered private blockchains, the importance of which will be discussed hereafter with reference to a public/private chain system. Finally, the control contract storage 405 includes an owner address 409, which is the address on the public blockchain 103 of an account controlled by the owner of the control contract (the user who deployed the control contract).

Figure 5:
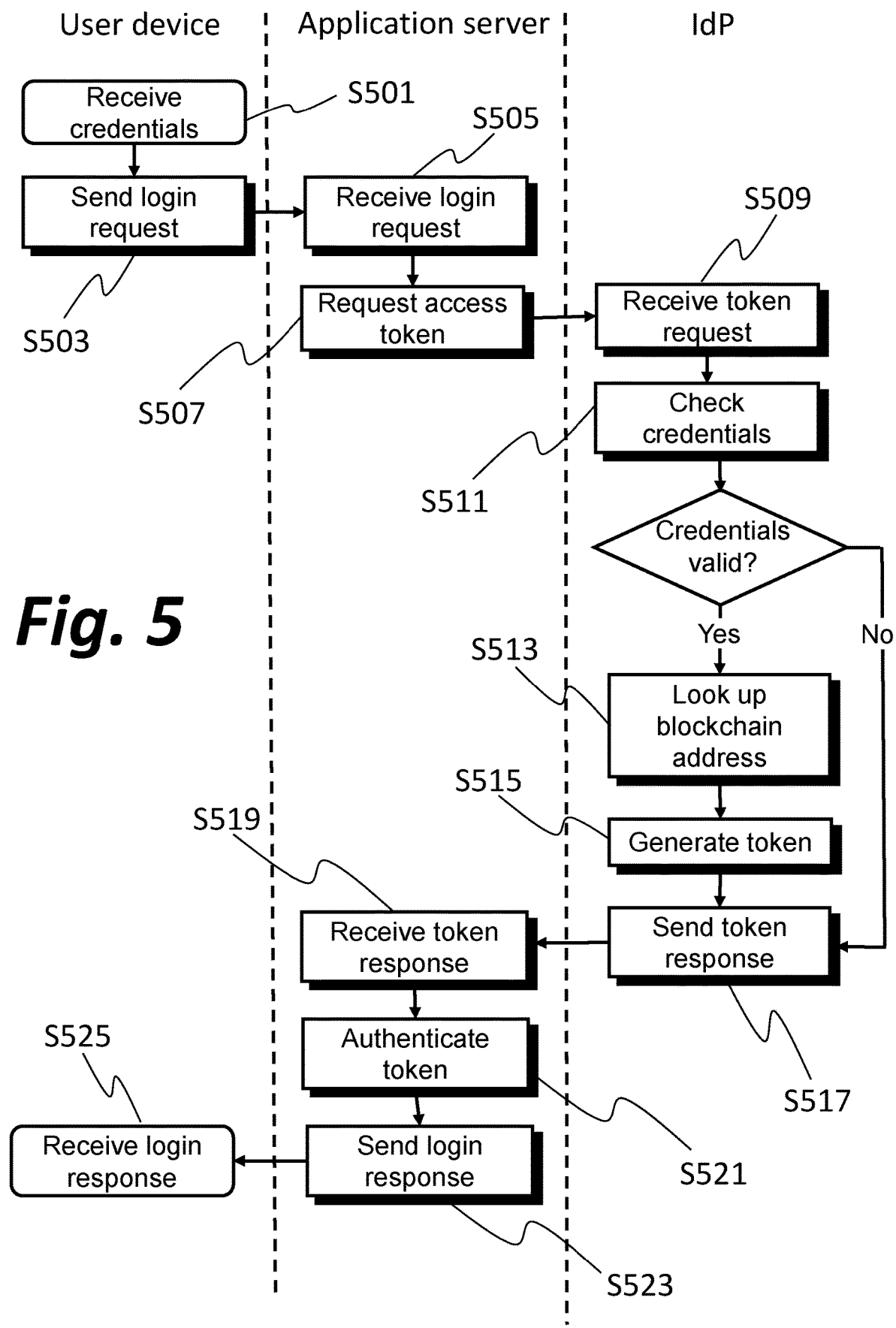
FIG. 5 is a flow diagram representing a routine for logging into the application server of FIG. 1.

FIG. 5 shows an example in which a user of first user device 113 logs into the application server 105. First user device 113 receives, at S501, credentials from the user. The credentials may include, for example, a username and/or email address, a password, a secret, or the answer to a secret question. In some examples, multi-factor authentication may be used. First user device 113 sends, at S503, a login request to the application server 105. The login request includes credentials received from the user at S501. In response to receiving the login request at S505, the application server 105 requests, at S507, an access token from the IdP 116. The IdP 116 receives the access token request at S509, and checks, at S511, whether the credentials are valid. If the credentials are valid, the IdP 116 looks up, at S513, a blockchain address of an account associated with the user. In this example each registered user of the application server 105 has an identity mapped to a unique address on the public blockchain 103.

The IdP 116 generates, at S515, an access token. In this example, the access token is a JavaScript Object Notation Web Token (JWT). The JWT includes header, payload, and signature fields. The IdP 116 uses a private key to generate the signature of the JWT by applying a hashing algorithm to data including the cryptographic key and a concatenation of the header and the payload. In this example, the HMAC-SHA256 (Hash-based Message Authentication Code—Secure Hashing Algorithm, 256 bit) algorithm is used. In other examples, other hashing algorithms may be used. In some examples, the hashing algorithm is specified in the header of the JWT. In this example, the payload field includes the blockchain address looked up at S513. In other examples, the payload field of the JWT includes data representing the identity of the user of first user device 113. The application server 105 and the taxonomy server 112 maintain token authentication keys corresponding to private keys used by IdP 116 to generate the JWT. In this example, the token authentication key 215 is a public key corresponding to the private key used by the IdP 116 to generate the JWT. In other examples, a token authentication key may be a private key identical to the private key used to generate an access token.

The IdP 116 sends, at S517, a token response to the application server 105. If the credentials received at S501 are valid, the token response includes the access token generated at S515. If the credentials received at S501 are not valid, the token response indicates that the credentials are not valid. The application server 105 receives the token response at S519.

If the application server 105 receives an access token from the IdP 116, the application server 105 authenticates, at S521, the access token. As mentioned above, the application server 105 maintains the token authentication key 215 corresponding to the cryptographic key used by the IdP 116 to generate the signature of the access token, and therefore by applying the same hashing algorithm to the concatenation of the header and payload of the access token, the application server 105 is able to verify the signature and hence verify that the access token was generated by the IdP 116 and has not been modified (for example, by a malicious third party).

The application server 105 sends, at S523, a login response to first user device 113. If the application server 105 receives a valid access token at S519, the login response indicates that the login is successful. If the application server 105 does not receive a valid access token at S519, the login response indicates that the login is unsuccessful. First user device 113 receives the login response at S525.

In the example described above, the IdP 116 maintains a list of users associated with accounts on the public blockchain 103, along with blockchain addresses of the associated accounts, which allows the IdP 116 to generate an access token with a payload containing a blockchain address of a user. In other examples, an application server may instead store a list of users associated with accounts, along with blockchain addresses of the associated accounts. In such an example, the application server may authenticate an access token received from an IdP 116, and if the access token is successfully authenticated, may then look up an associated blockchain address.

Figure 6A:
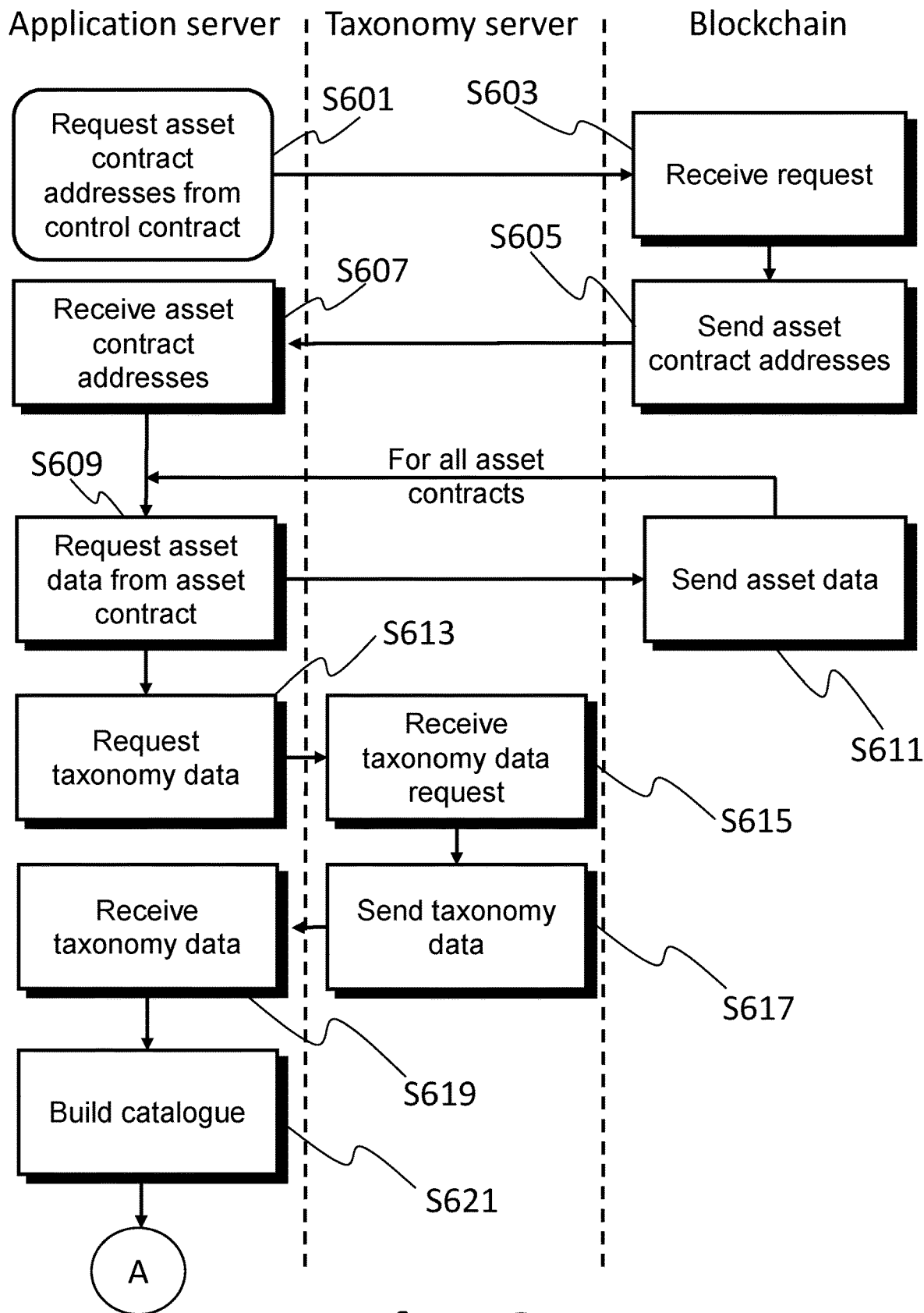
FIGS. 6a and 6b is a flow diagram representing a routine for requesting data from a public blockchain.
Figure 6B:
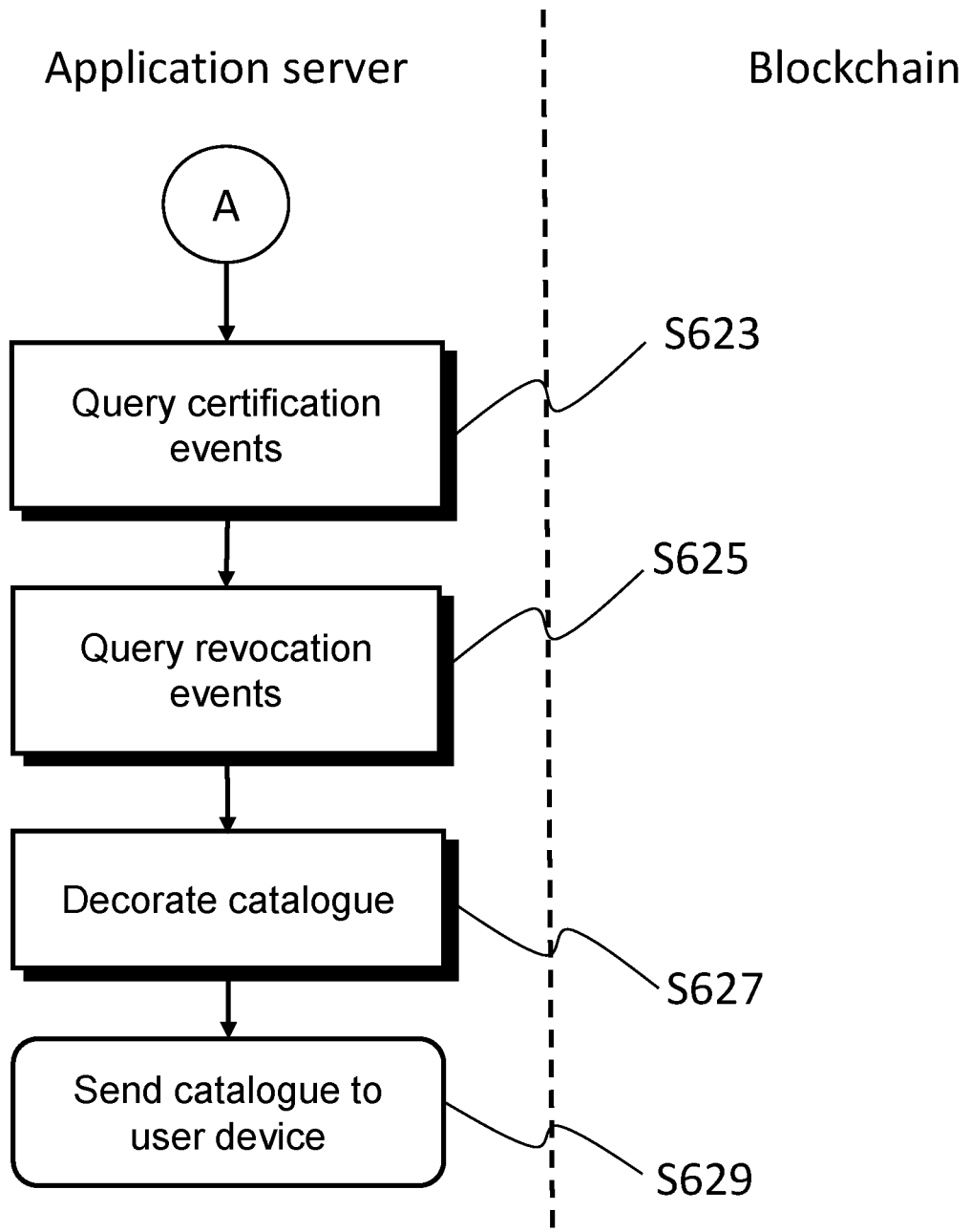

FIG. 6 shows an exemplary method in which the application server 105 requests data stored on the public blockchain 103 on behalf of a user of first user device 113. Prior to the routine of FIG. 6 taking place, the user requesting data is authenticated according to the routine of FIG. 5. In this example, the user requests data corresponding to assets associated with asset contracts controlled by the control contract 401 on the public blockchain 103, as well as data indicating users that are associated with those assets. The application server 105 requests, at S601, asset contract addresses from the control contract 401 stored on the public blockchain 103. In this example, the request is in the form of an RPC request. Specifically, the RPC request is an Ethereum JSON-RPC-2.0 request sent to one of the nodes of the public blockchain 103, specifying the address of the control contract 401 as a recipient address, and operable to invoke a constant method on the public blockchain 103. Unlike transactional methods, constant methods do not cause a change to the state of a blockchain.

As discussed above with reference to FIG. 4, the control contract storage 405 includes the addresses of asset contracts stored on the public blockchain 103. In response to receiving, at S603, the request for asset contract addresses, the control contract 401 sends an RPC response, at S605, to the application server including addresses of asset contracts stored on the public blockchain 103. The application server 105 receives the RPC response including the addresses of the asset contracts at S607. The application server 105 requests, at S609, asset data from each of the asset contracts with addresses stored in the control contract storage 405. Specifically, the application server 105 sends, for each of the asset contracts, an RPC request specifying the asset contract address as a recipient address. In this example, the requested asset data includes the name of the asset, and a unique identifier for the asset. In response to receiving a request for asset data, each asset contract sends asset data to the application server at S611.

Having received asset data from each of the asset contracts with addresses stored on the control contract 401, the application server 105 requests, at S613, taxonomy data from the taxonomy server 112. The taxonomy server 112 receives, at S615, the request for taxonomy data and sends, at S617, taxonomy data to the application server 105. The taxonomy data includes additional metadata corresponding to the asset contracts. In this example, the taxonomy data includes metadata defining a hierarchy of assets corresponding to the asset contracts. In response to receiving the taxonomy data at S619, the application server 105 builds, at S621, a catalogue of assets using the taxonomy data and the asset data received from the asset contracts.

The application server 105 queries the public blockchain 103, at S623, for certification events. Certification events are generated each time a witness with an appropriate cTrust level certifies evidence data indicating that a user is associated with an asset, as will be described in detail hereafter. The skilled person will be aware that events generated on an Ethereum-based blockchain are conveniently indexed for searching and filtering. In this example, the certification events returned in response to the query are filtered according to the public blockchain address associated with the user to which the data request pertains, such that only certifications corresponding to that user are returned. The certification events are also filtered according to the public blockchain address of the asset contract to which the certification event relates.

The application server 105 queries the public blockchain 103, at S625, for revocation events. Revocation events are generated each time a user with appropriate privileges revokes a certification of evidence. Revocation will be discussed in detail hereafter. In this example, the revocation events returned in response to the query are filtered according to the public blockchain address associated with the user to which the data request pertains, such that only revocation events corresponding to that user are returned.

The application server 105 decorates, at S627, the catalogue of assets built at S621, using the received certification events, and the received revocation events. Decorating the catalogue includes incorporating the information indicated by the certification and revocation events, such that entries of the catalogue corresponding to assets also indicate whether the evidence has been certified with regard to the asset and whether such a certification has subsequently been revoked. The application server 105 sends the decorated catalogue of assets to first user device 113 at S629.

In the example described above, a current user of first user device 113 requests data corresponding to assets with which the current user is associated. In other examples, a current user may request data corresponding to assets with which a different target user is associated. In these examples, the current user selects the target user from the list of users maintained by the IdP 116. In these examples, the returned certification and revocation events are filtered according to the different target user.

In the example above, a user logs into the application server 105 with first user device 113 in order to access data stored on the public blockchain 103. In another example a user accesses data stored on the public blockchain 103 using second user device 115 using a browser-based DApp. In this example, steps performed by the application server 105 in FIG. 6 are performed by the second user device 115 using the browser-based DApp, but the browser-based DApp may not have access to the taxonomy server 112 and may therefore not receive taxonomy data in order to build a catalogue of assets, including an asset hierarchy and additional metadata corresponding to asset contracts, as described above. In a further example still, a user device running a browser-based DApp may access a taxonomy server in order to receive taxonomy data.

Figure 7:
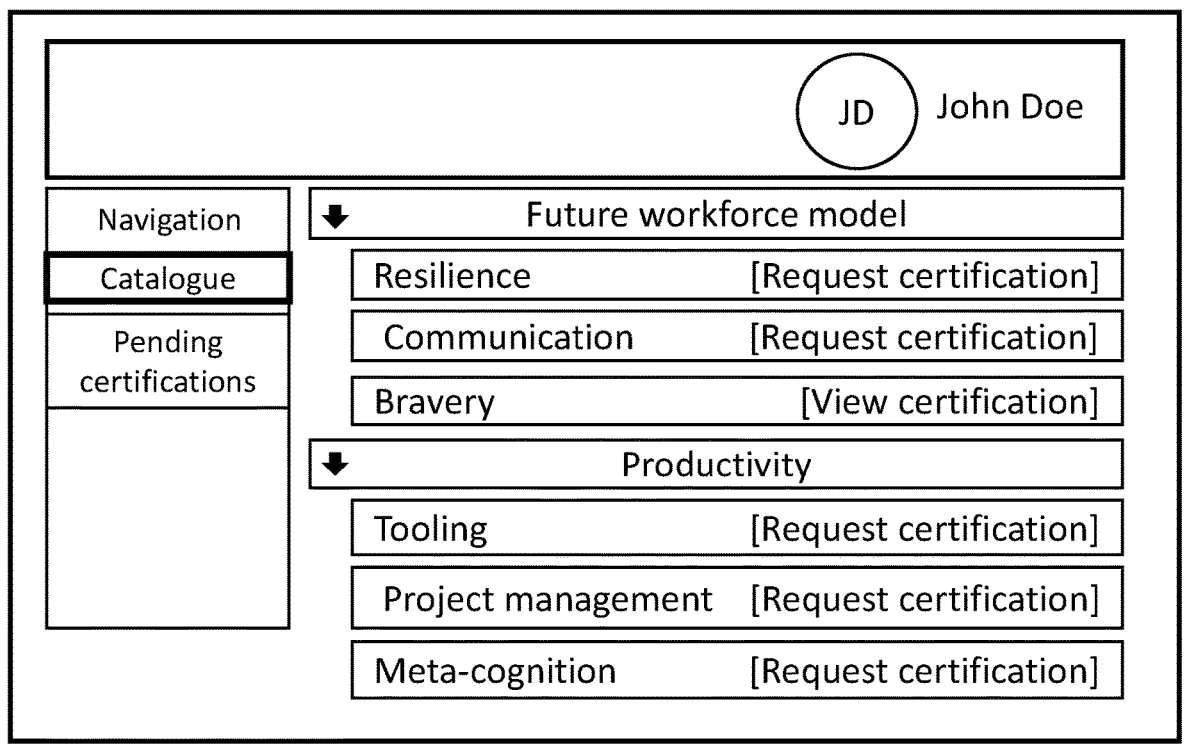
FIG. 7 schematically shows a screenshot from a user device logged into an application server.

FIG. 7 schematically shows an example of a screenshot taken from the user device 113, having logged into the application server 105 and downloaded an asset catalogue as described above with reference to FIG. 6. The screenshot includes a navigation bar including two menu items. The first item, entitled "Catalogue", navigates to the catalogue as seen in the screenshot. In this example the catalogue includes two dropdown menus entitled "Future workforce model" and "Productivity", as defined by taxonomy data received from the taxonomy server 112. Each of the dropdown menus includes three items. Each item corresponds to an asset associated with an asset contract on the public blockchain 103. The user John Doe is yet to be certified for most of the items, and may select "Request certification", which will initiate a routine equivalent to that of FIG. 8 below. The user John Doe has already been certified for the asset "Bravery", and may select "View certification" in order to view the certification, including previously-uploaded evidence associated with the certification.

The navigation bar in FIG. 7 further includes a menu item entitled "Pending certifications", which navigates to a list of pending certification requests which the user John Doe may certify. In order for the user to view the list of pending certification requests, the application server 105 sends an RPC request to each asset contract listed by the control contract 401, requesting pending certification requests. Pending certification requests are indicated by certification structures stored on the asset contracts, such as the certification structures 313 stored by asset contract 301.

Figure 8:
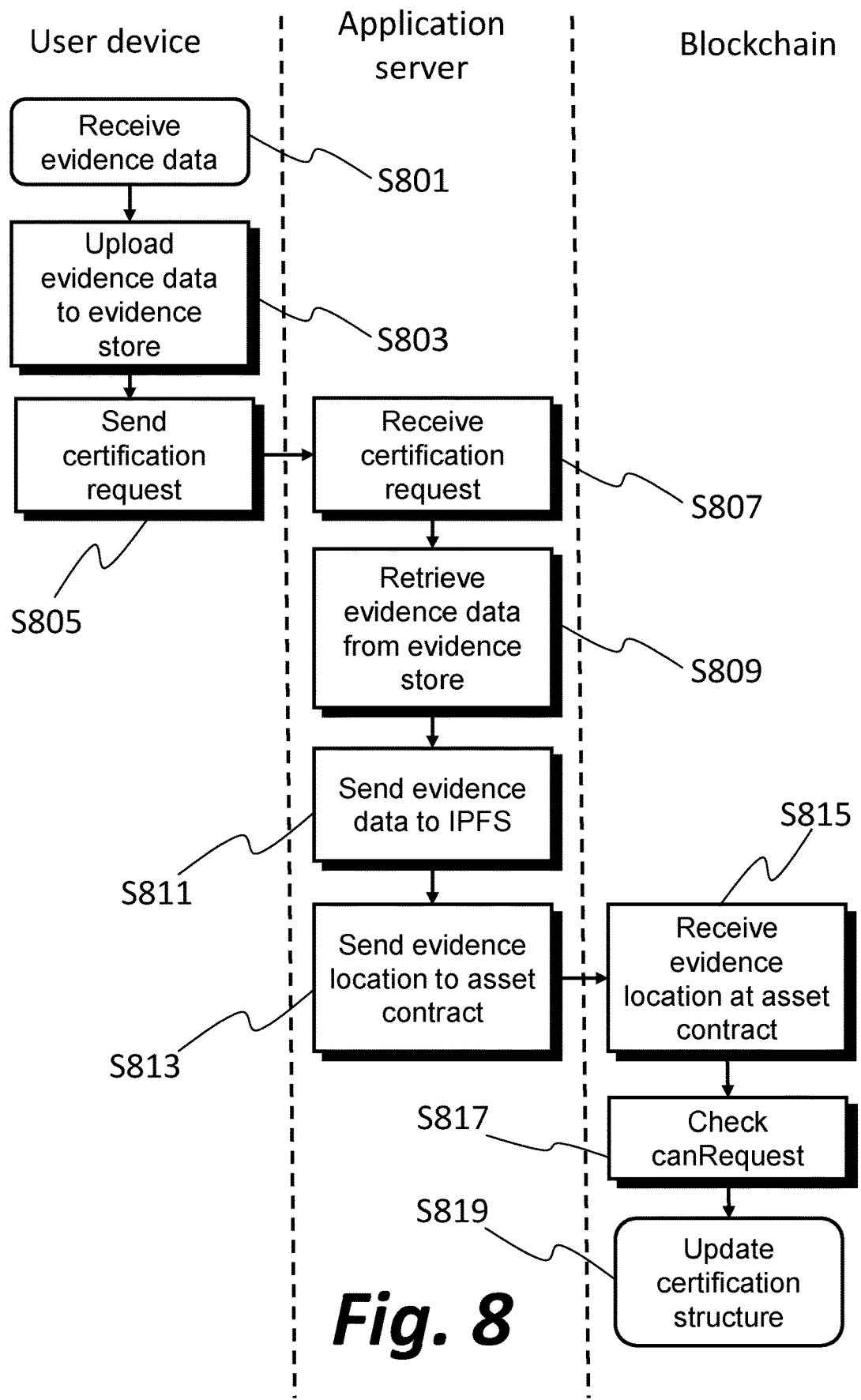
FIG. 8 is a flow diagram representing a routine for requesting a certification of evidence.

FIG. 8 shows an exemplary method in which a user requests certification of evidence data. In this example, the evidence data indicates that a user of first user device 113 is associated with an asset corresponding to the asset contract 301 stored on the public blockchain 103. First user device 113 receives, at S801, the evidence data. In this example, the evidence data includes a digital photograph of a certificate of training issued by an employer. In this example, first user device 113 receives the evidence data via an email sent by the employer to the user. In other examples, a user may upload evidence data to a user device, or may generate evidence data, for example by taking a photograph of evidence using a camera of the user device. First user device 113 uploads, at S803, the evidence data to the evidence store 107.

Having uploaded the evidence data to the evidence store 107, first user device 113 sends, at S805, a request to the application server 105 for the evidence data to be certified. The request for certification includes data indicating a first location at which the evidence data is stored, and data indicating the asset to which the evidence relates. In this example, the request includes a URL corresponding to a location in a virtual AWS database. The application server 105 receives the request at S807.

The application server 105 retrieves, at S809, the evidence data from the evidence store, and sends, at S811, the evidence data to a node of a distributed data store configured using the IPFS protocol. The evidence data is stored in the distributed data store. The application server 105 then sends, at S813, an RPC request to the asset contract 301 including data indicating a location in the distributed data store at which the evidence data is stored. In other examples, the steps S809 and S811 are omitted, and the RPC request instead indicates a first location at which the evidence data is stored, for example on a virtual data store or a physical database. In some such examples, the evidence data is already available prior to a user requesting certification (for example, the evidence may be a video uploaded on YouTube). In such an example, step S803 is omitted.

The RPC request sent at S813 causes a transaction leading to a change of state of the public blockchain 103, and therefore requires Ether to be sent from an account on the public blockchain 103. In this example, the account is associated with an Ethereum wallet maintained by the owner of the control contract 401.

The public blockchain 103 receives, at S815, the RPC request indicating the location in the distributed data store at which the evidence data is stored. The RPC request causes the asset contract 301 to checks, at S817, whether the user is assigned a canRequest privilege. In order to check whether the canRequest privilege has been assigned, the asset contract 301 sends a message to the control contract 401, causing the control contract 401 to send a message to the asset contract 301 indicating whether the canRequest privilege has been assigned to the user. If the canRequest privilege has been assigned to the user, the certification structure corresponding to the user is updated at S819. In this example, the asset contract 301 does not have a certification structure corresponding to the user prior to the routine of FIG. 8 taking place, and updating the certification structure includes generating the certification structure. The certification structure is updated to associate the evidence data with the user. In particular, the certification structure is updated to indicate that evidence data has been uploaded relating to the asset, and further to indicate the location in the distributed data store at which the evidence data is stored.

In another example, steps S801 to S813 are carried out by second user device 115 using a browser-based DApp, rather than being carried out by the application server 105. In this example, second user device 115 maintains an Ethereum wallet such that Ether may be available for making transactional changes to the public blockchain 103.

Figure 9A:
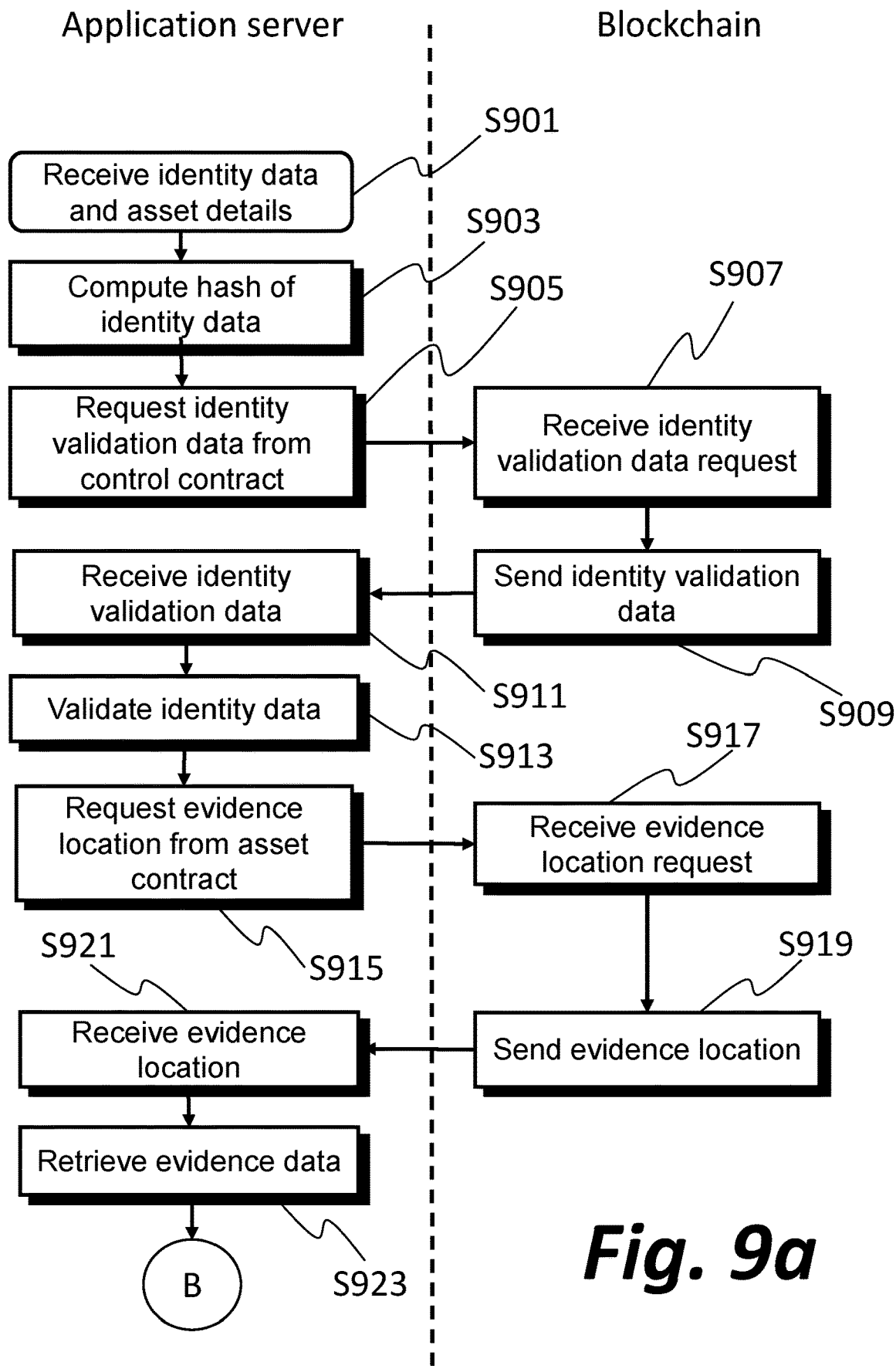
FIGS. 9a and 9b is a flow diagram representing a routine for performing a certification of evidence.
Figure 9B:
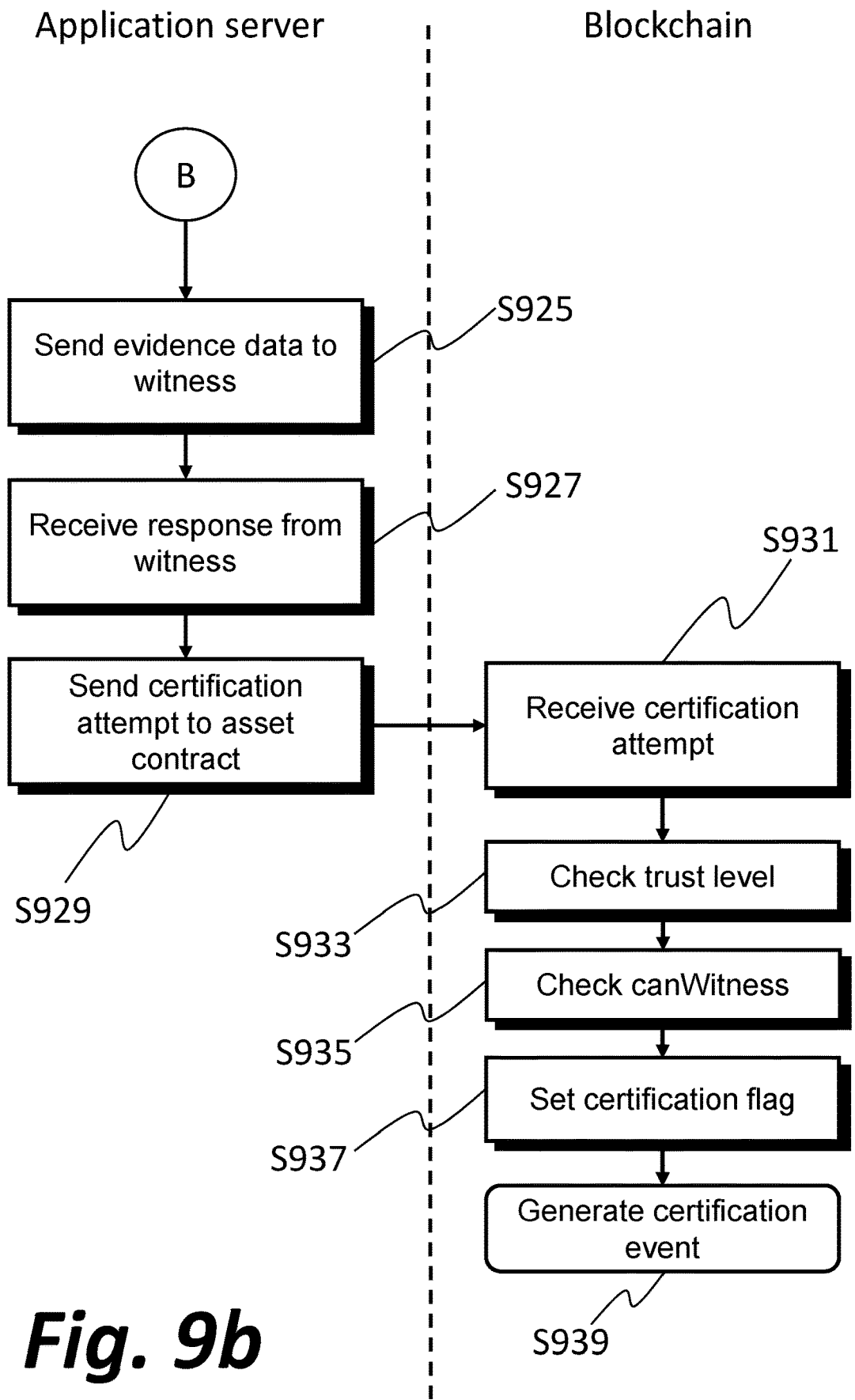

FIG. 9 shows an exemplary method in which evidence data is certified by a witness using first user device 113. In this example, prior to the routine of FIG. 9 commencing, a user requests certification of user data using the routine of FIG. 8, and therefore a certification structure of asset contract 301 associates the evidence data with the user who requested the certification of evidence data. The evidence data indicates that a user is associated with an asset corresponding to the asset contract 301 stored on the public blockchain 103. In this example, the witness is a user who is assigned a global cTrust level that at least as high as the cTrust level of the asset to which the evidence relates, and is further assigned the canWitness privilege, which together permit the witness to certify evidence relating to the asset. In other examples, a witness may have a global cTrust level that is lower than the cTrust level of an asset, but has an asset-specific cTrust level that is at least as high as the cTrust level of the asset, which similarly permits the witness to certify evidence relating to the asset.

In this example, the witness logs into the application server 105 with first user device 113 using the login routine of FIG. 5. The application server 105 is therefore in possession of the address of an account on the public blockchain 103 associated with the witness. In advance of the routine of FIG. 9 taking place, the application server 105 queries the asset contracts stored on the public blockchain 103 for pending certification requests, such that the witness is able to view a list of pending certification requests.

In this example, the witness is physically approached by the user seeking certification of evidence. The user provides the witness with identity materials, for example a passport, and evidence materials corresponding to the asset to which the certification request relates. The witness enters identity data derived from the identity materials into the first user device 113. In this example, the identity data includes the passport number and date of birth of the user seeking certification of evidence. The application server receives, at S901, the identity data from first user device 113. The application server 105 computes, at S903, a hash of the identity data. In this example, the HMAC-SHA256 algorithm is used to compute the hash. In other examples, other hashing algorithms may be used. In some examples, a user device of a witness computes a hash of the identity data, and sends the computed hash to an application server.

Having computed a hash of the identity data, the application server 105 sends, at S905, an RPC request to the control contract 401 stored on the public blockchain 103. In this example, the RPC request is an Ethereum JSON-RPC-2.0 request operable to invoke constant methods on the public blockchain 103. The RPC request includes the blockchain address of the account associated with the user seeking certification of evidence, and a request for identity validation data. As discussed above, the control contract 401 stores identity validation data for users associated with addresses on the public blockchain 103, including a hash of identity data provided by the user during an initial registration process. The control contract 401 receives, at S907, the request for identity validation data, and sends, at S909, identity validation data to the application server 105. The application server 105 receives the identity validation data at S911. The application server 105 validates, at S913, the identity data received at S901. In this example, validating the identity data includes comparing the hash computed at S903 with the hash included within the evidence validation data received at S911.

Having validated the identity data, the application server sends, at S915, an RPC request to the asset contract 301, which corresponds to the asset for which evidence is to be certified, requesting the location of the evidence data to be certified. As discussed above, the asset contract 301 stores certification structures 313 indicating the location of evidence data. Having received, at S917, the request for the location of evidence data, the asset contract 301 sends, at S919, data indicating the location of the evidence data. The application server 105 receives, at S921, the data indicating the location of the evidence data, and retrieves, at S923, the evidence data. The application server 105 sends, at S925, the evidence data to first user device 113.

The witness checks the evidence data and decides whether to certify the evidence data. In this example, checking the evidence data includes comparing the evidence data with the evidence materials provided by the user. If the witness decides to certify the evidence data, first user device 113 sends a request to the application server 105 indicating that the evidence data is to be certified. The application server 105 receives, at S927, the request from first user device 113. The application server 105 sends, at S929, a certification attempt to the asset contract 301 in the form of an RPC request. The RPC request causes a transaction leading to a change of state of the public blockchain 103, and therefore requires Ether to be sent from an account on the public blockchain 103. In this example, the account is associated with an Ethereum wallet maintained by the owner of the control contract 401. The certification attempt is received, at S931, at the asset contract 301. Having received the certification attempt, the asset contract 301 checks, at S933, the cTrust level of the witness, and further checks, at S935, whether the witness is assigned the canWitness privilege. In order to check the cTrust level of the witness and whether or not the witness is assigned canWitness privilege, the asset contract 301 sends a message to the control contract 401, causing the control contract 401 to send a message to the asset contract 301 indicating a global cTrust level, and an asset-specific cTrust level, of the witness, along with an indication of whether the canWitness privilege has been assigned to the witness. If either the global cTrust level of the witness, or the asset-specific cTrust level for the witness, is at least as high as the cTrust level of the asset corresponding to the asset contract 301, and the canWitness privilege has been assigned to the witness, the witness is permitted to certify evidence data indicating that the user is associated with the asset.

If the witness is permitted to certify the evidence, the asset contract 301 sets, at S937, a certification flag in the certification structure corresponding to the user. The asset contract 301 generates, at S939, a certification event on the public blockchain 103. Certification events are used by the application server 105 to decorate catalogues of assets provided to users, as described above with reference to FIG. 6.

In the example of FIG. 9, a witness logs into the application server 105 with first user device 113 in order to perform a certification evidence data. In another example, a witness performs a certification of evidence data using second user device 115 using a browser-based DApp. In this example, the steps performed by the application server 105 in FIG. 9 are performed by second user device 115. Accordingly, second user device 115 maintains an Ethereum wallet such that Ether may be available for making necessary transactional changes to the public blockchain 103.

In some examples, a witness may certify evidence data without validating identity data. This may be suitable, for example, for assets having a relatively low value. In such cases, the steps of S903 to S913 may be omitted from the routine of FIG. 9. Furthermore, in some examples, a witness may not be approached physically by a user, and may simply perform the certification of evidence data based on viewing the evidence data alone, without ever seeing the corresponding evidence materials. The decision as to whether a witness needs to view evidence physically will depend on the nature of the asset and the evidence. In some examples, the decision is at the discretion of the witness.

In the present example, only one certification may be performed for each certification request, even if a first certification is subsequently revoked, as will be described in detail below.

Figure 10:
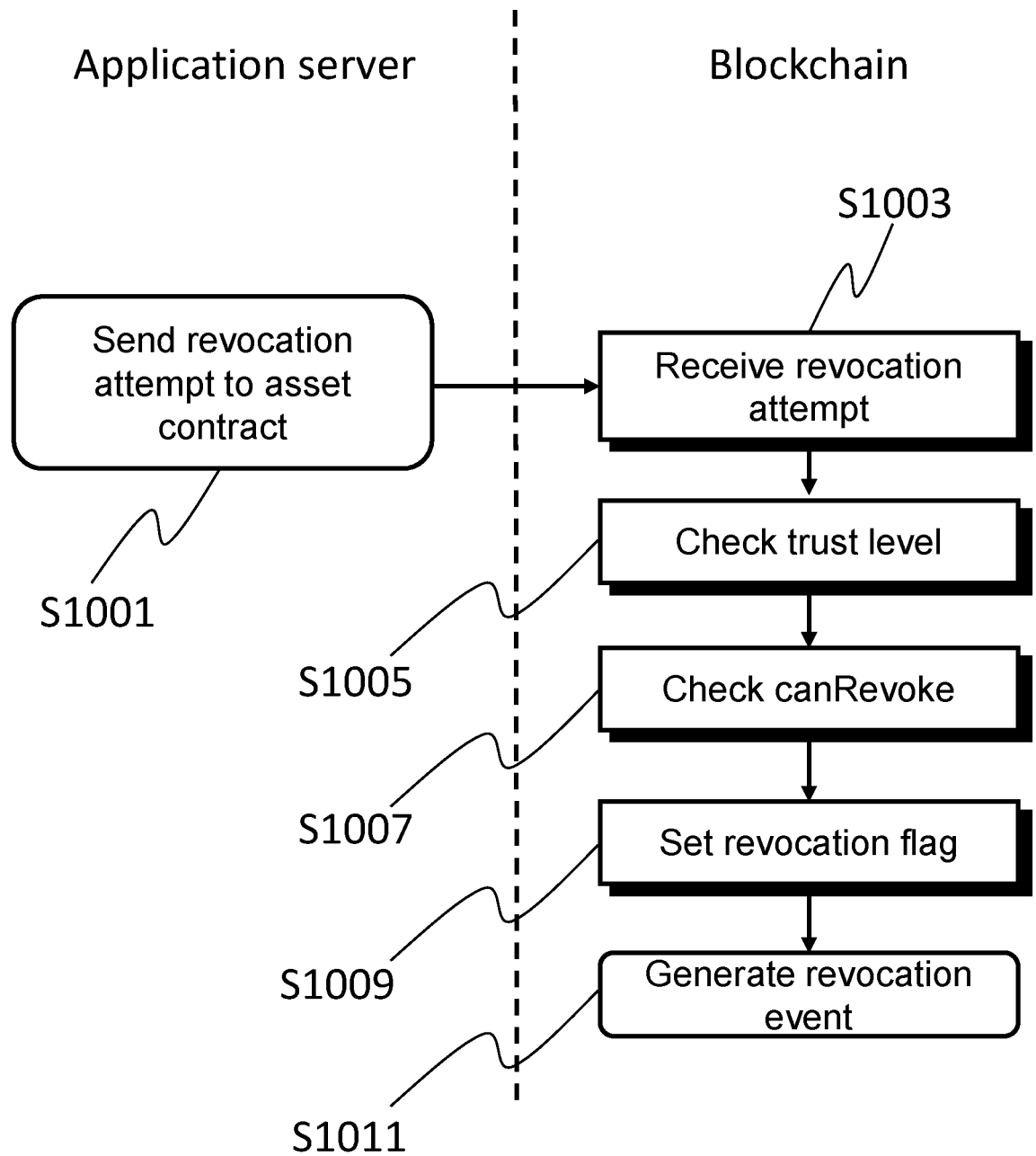
FIG. 10 is a flow diagram representing a routine for revoking a certification of evidence.

FIG. 10 shows an example in which a user of first user device 113 revokes a certification of evidence data, the evidence data indicating that a user is associated with an asset corresponding to the asset contract 301. In this example, the user logs into the application server 105 with first user device 113 using the login routine of FIG. 5. The application server 105 is therefore in possession of the blockchain address of an account associated with the user. Subsequently, the application server 105 performs the routine of FIG. 6 in order to provide the user with a catalogue of assets. The application server 105 sends, at S1001, a revocation attempt to the asset contract 301 in the form of an RPC request. The revocation attempt contains data including the blockchain address of the user to whom the evidence data relates.

The revocation attempt is received, at S1003, at the asset contract 301. In response to receiving the certification attempt, the asset contract 301 checks, at S1005, the cTrust level of the user, and further checks, at S1007, whether the canRevoke privilege has been assigned to the user. In order to check the cTrust level of the user and whether the canRevoke privilege has been assigned to the user, the asset contract 301 sends a message to the control contract 401, causing the control contract 401 to send a message to the asset contract 301 indicating a global cTrust level, an asset-specific cTrust level, of the witness, and an indication of whether the user has revocation rights. In order to be permitted to revoke a certification of evidence, either the global cTrust level of the user, or the asset-specific cTrust level of the user, must be at least as high as the cTrust level of the asset corresponding to the asset contract 301, and the user must also have revocation rights.

If the user is permitted to revoke the certification of evidence, the asset contract 301 sets, at S1009, a revocation flag in the certification structure corresponding to the user.

The asset contract 301 generates, at S1011, a revocation event on the public blockchain 103. Revocation events are used by the application server 105 to decorate catalogues of assets provided to users, as described above with reference to FIG. 6.

In the example of FIG. 10, a user logs into the application server 105 with first user device 113 in order to perform a certification evidence data. In another example, a user performs a revocation of evidence data using second user device 115 using a browser-based DApp. In this example, the steps performed by the application server 105 in FIG. 9 are performed by the second user device 115. Accordingly, second user device 115 maintains an Ethereum wallet such that Ether may be available for making necessary transactional changes to the public blockchain 103.

Certifications of evidence, and subsequent revocations of such certifications, may be queried using certification and revocation events, as discussed in the example of FIG. 6. Alternatively, a user may send an RPC request to a specific asset contract stored on the public blockchain 103, requesting certification data corresponding to a specific user. In this case, the RPC request includes the blockchain address of the account associated with the user for which evidence data is certified. If the user has requested a certification of evidence, the asset contract sends an RPC response including a location at which the evidence data is stored, and indicating whether certification and/or revocation flags are set in the certification structures of the asset contract. If the user has not requested a certification of evidence, the asset contract sends an RPC response indicating that the user has not requested a certification of evidence.

Figure 11A:
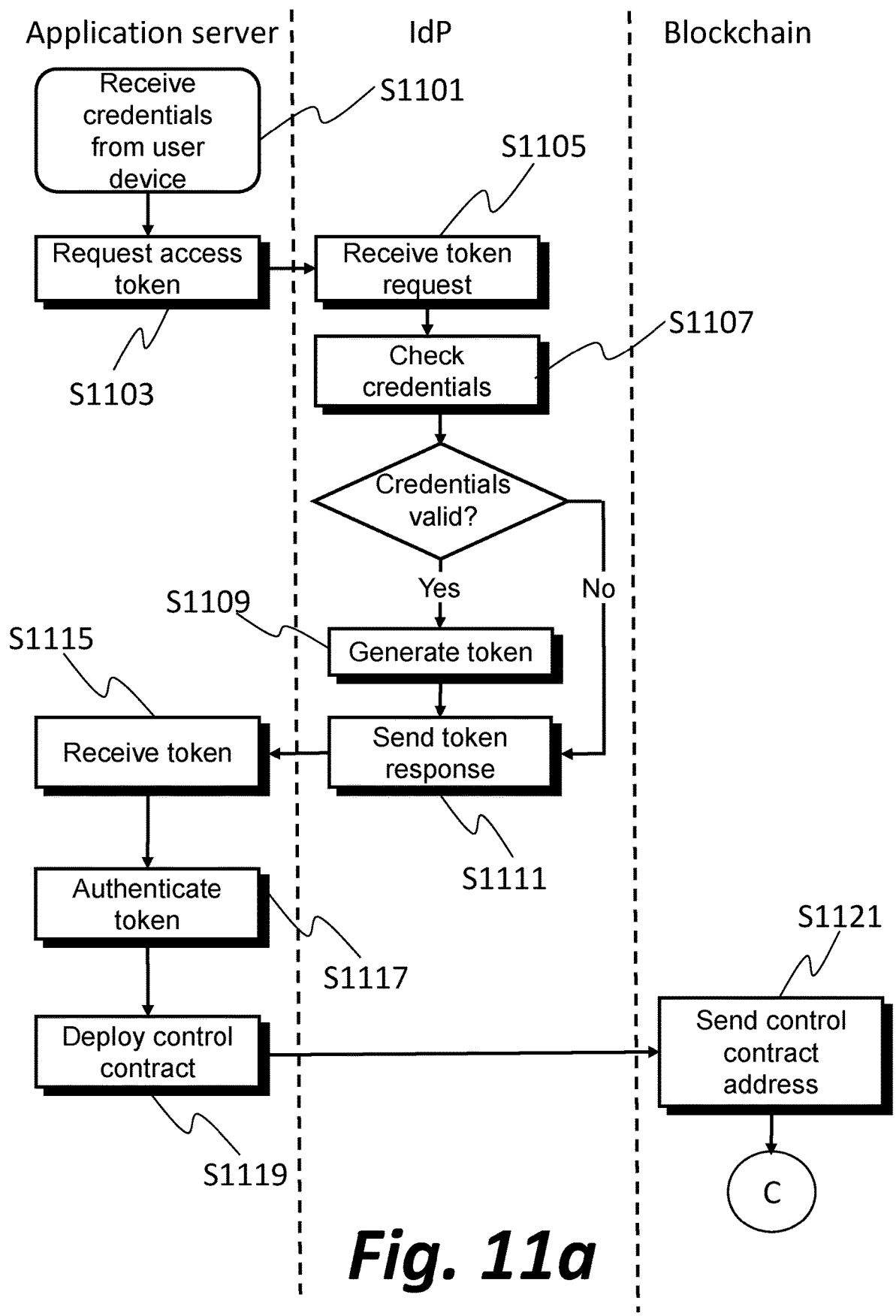

FIG. 11 shows an example in which a user of first user device 113 having administrative privileges deploys the control contract 401, along with asset contracts, on the public blockchain 103 using the application server 105. The application server 105 receives, at S1101, user credentials from the first user device 113. The application server 105 requests, at S1103, an access token from the IdP 116 for access to the taxonomy server 112. The IdP 116 receives the access token request at S1105, and checks, at S1107, whether the user credentials received at S1101 are valid. If the user credentials are valid, the IdP 116 generates, at S1109, an access token for access to the taxonomy server 112. In this example, the access token is a JWT. The IdP 116 sends, at S1111, a token response to the application server 105. If the credentials received at S1101 are valid, the token response includes the access token generated at S1109. If the credentials received at S1101 are not valid, the token response indicates that the credentials are not valid. The application server 105 receives the token response at S1115 and authenticates the access token at S1117.

The application server deploys, at S1119, the control contract 401 on the public blockchain 103. Deploying the control contract 401 requires Ether to be sent from an account on the public blockchain 103. In this example, the account is associated with an Ethereum wallet maintained by the operator of the application server 105. Initially, the control contract 401 stores no user addresses or asset addresses. Deploying the control contract 401 includes storing, in the control contract storage 405, the address of a user account associated with the user deploying the control contract, such that the address becomes the owner address 409, and the user becomes the owner of the control contract 401. As described above, certain operations are only permitted to be performed by the owner of the control contract 401.

When the application server 105 deploys the control contract 401, the control contract 401 is assigned an address on the public blockchain 103. The public blockchain 103 sends, at S1121, the assigned address to the application server 105. The application server 105 receives, at S1123, the assigned address of the control contract 401, and stores the address in a configuration file, such that the application server 105 can subsequently look up the control contract 401.

The application server 105 requests, at S1125, taxonomy data from the taxonomy server 112. The taxonomy data includes metadata corresponding to assets. In this example, the metadata for an asset includes the name of the asset and a unique identifier for the asset. The taxonomy data in this example further defines a hierarchy of assets. The request for taxonomy data includes the access token generated at S1109. The taxonomy server 112 receives, at S1127, the request for taxonomy data and authenticates, at S1129, the access token using a token authentication key maintained by the taxonomy server 112, as mentioned above. Having authenticated the access token, the taxonomy server 112 sends, at S1131, taxonomy data to the application server 105.

The application server 105 receives, at S1133, the taxonomy data from the taxonomy server 112. As mentioned above, the taxonomy data includes names and unique identifiers of one or more assets. For each asset identified in the taxonomy data, the application server 105 deploys, at S1135, an asset contract on the public blockchain, using the name of the asset and the unique identifier for the asset as constructor parameters such that the deployed asset contract stores the name and the unique identifier. The deployed asset contract is assigned an address on the public blockchain 103. The public blockchain 103 sends, at S1137, the assigned address of the asset contract to the application server 105. The application server 105 sends, at S1139, an RPC request to the deployed asset contract, the RPC request including the blockchain address of the control contract 401. The RPC request causes the asset contract to set the address of the control contract 401 in the control contract address field of the asset contract. The RPC request further causes the asset contract to send a message to the control contract 401, which causes the control contract 401 to add the asset address to the control contract storage 405, thereby registering, at S1141, the asset contract on the control contract.

Once a control contract has been deployed, the owner of the control contract (the user who deployed the control contract) may register user accounts with the control contract, such that for each registered user account the control contract stores the blockchain address of the user account, and an associated user structure. In this example, registering with the control contract includes the user providing the owner of the control contract with identity data, and the user structure includes a hash of the provided identity data as mentioned above.

In the example of FIG. 11, a new control contract is deployed on the public blockchain 103. In another example, a control contract already exists on a blockchain, and is updated to include additional assets identified in taxonomy data. In this example, the routine of FIG. 11 is adapted to include initial steps in which the existing control contract is queried for existing asset contracts on the blockchain, and the existing asset contracts are then queried for asset data, including the names and unique identifiers of the existing asset contracts. The routine then follows the steps of S1125-S1141 to deploy additional asset contracts for any assets identified in the taxonomy data but not yet having corresponding asset contracts on the blockchain.

Private Chain System

A private distributed ledger may be deployed as a fork of a blockchain project on a public blockchain, and may be customised for private use. In such a deployment, a mining difficulty level (or equivalent parameters for another consensus algorithm) is configured to avoid resource wastage (e.g. in mining operations), as trust is not a primary concern in such a deployment. Using private distributed ledgers for data storage or processing is generally considered to be against the ethos of most distributed ledger applications, in which the decentralised trust model is considered to be the primary advantage. However, the applicant has identified a number of advantages in using private distributed ledgers within a data processing system. For example, a private distributed ledger offers distributed redundancy across multiple nodes, as well as a verifiable immutable state as a result of the chain of blocks that comprise the private distributed ledger. Furthermore, the private distributed ledger may have an identical virtual machine model for contract code execution and identical Application Programming Interfaces (APIs) to the public blockchain.

In some examples, a single entity, such as a corporate entity, may deploy a system such as the system described above with reference to FIG. 1 in order to associate users with assets relevant to the entity. For example, a corporate entity may wish to maintain a record of assets corresponding to training outcomes, and a corresponding record of employees that have achieved the training outcomes. Such records may be freely available to employees of the corporate entity, or to a subset of employees, but may also be of interest to other entities or individuals not employed by the corporate entity. Such records, and evidence data relating to certification of such records may, however, be private, and the corporate entity may wish to exert centralised control over who is permitted to access the corresponding data.

Figure 12:
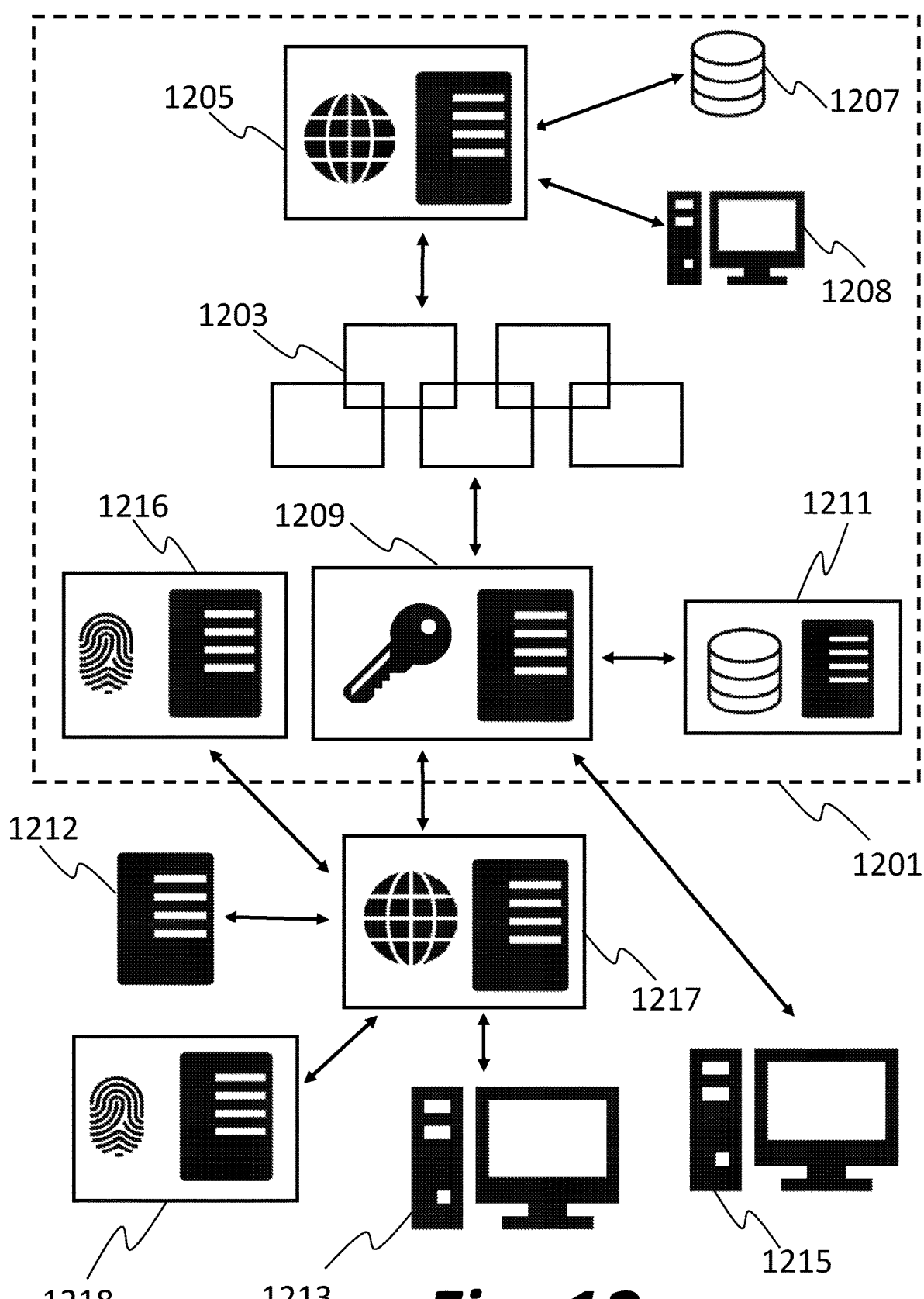
FIG. 12 is a schematic diagram of a system for storing and processing data on a private blockchain.

FIG. 12 shows a second example of a system for storing and processing data in accordance with the present invention. The system includes on-site components, which are shown within the dashed box 1201, and off-site components, which are shown outside the dashed box 1201. The on-site components are connected by a private network. In this example, the on-site components are operated by single corporate entity, and are located at the same physical site. The private network in this example is a Local Area Network (LAN). In other examples, on-site components are located across several different physical sites, and the private network is a Virtual Private Network (VPN).

The on-site components include computing devices acting as nodes to host a private distributed ledger 1203 (referred to hereafter as the private blockchain 1203). The private blockchain 1203 in this example is a private Ethereum blockchain. The private blockchain 1203 stores a control contract and asset contracts similar to those described above with reference to FIGS. 3 and 4. In this example, the trust level data stored by an asset contract on the private blockchain 1203 includes vTrust level data. The vTrust level data stored by the asset contract includes a vTrust level for the asset, and may also include vTrust levels for specific certifications of evidence stored on the asset contract. In this example, during certification of evidence on the private blockchain 1203, a user performing the certification may set a vTrust level that is higher than a default vTrust level for the asset. As will be described in more detail hereafter, the vTrust levels of an asset and/or certification may be compared with vTrust levels of a user in order to determine whether a user of an off-site user device is permitted to view evidence associated with a certification of an asset.

The on-site components include an on-site application server 1205, which is configured to communicate via the private network with nodes of the private blockchain 1203. The on-site application server 1205 communicates with the nodes of the private blockchain 1203 by means of exchanging Remote Procedure Call (RPC) requests and responses. In this example, the on-site application server 1205 uses the Ethereum JSON-RPC-2.0 protocol to communicate with nodes of the private blockchain 1203. The on-site application server 1205 is operable to deploy contracts on the private blockchain 1203, and to make transactional changes to contracts stored on the private blockchain 1203, as will be described in detail hereafter. One function of the on-site application server 1205 is to deploy a control contract on the private blockchain 1203, and asset contracts controlled by the deployed control contract. Other functions of the on-site application server 1205 include altering global and asset-specific trust levels stored on the deployed control contract. The on-site application server 1205 is also configured to communicate with an on-site evidence store 1207 and multiple on-site user devices, including the on-site user device

1108. In this example, the on-site evidence store 1207 includes a database located at the physical site of the on-site components. The on-site evidence store 1207 is used to store evidence data indicating that users are associated with assets corresponding to asset contracts stored on the private blockchain 1203. The on-site application server 1205 provides access management services on behalf of users, including the user of the on-site user device 1108. The on-site application server 1205 is configured equivalently to the application server 105 shown in FIG. 2, and is operable to perform functions with respect to the private blockchain 1203 equivalent to those described with respect to the public blockchain 103 in FIGS. 6, 7, 8, 10, and 11.

The on-site components further include a firewall server 1209 for controlling communications with computing devices outside the private network 1201. The firewall server 1209 is configured to communicate with nodes of the private blockchain 1203, and with an audit server 1211. The firewall server 1209 communicates with the nodes of the private blockchain 1203 using the Ethereum JSON-RPC-2.0 protocol. The on-site components also include a private IdP 1216.

The off-site components include multiple off-site user devices, including first off-site user device 1213 and second off-site user device 1215. In this example, first off-site user device 1213 and second off-site user device 1215 are desktop computers. Other user devices may be laptop computers, tablet computers, smart phones, or any other type of user device capable of communicating with an application server using HyperText Transfer Protocol Secure (HTTPS). First off-site user device 1213 is configured to communicate with an off-site application server 1217. In some implementations of the present example, the off-site application server 1217 is a cloud-hosted virtual application server, for example a virtual application server provided by Amazon Web Services® (AWS). In other implementations, the off-site application server 1217 is a physical server. The off-site application server is further configured to communicate with the private IdP 1216, and a public IdP 1218.

The off-site application server 1217 provides an application interface to the first off-site user device 1213, and is configured to communicate with the private blockchain 1203 via the firewall server 1209 by means of exchanging Remote Procedure Call (RPC) requests and responses. In this example, the off-site application server 1217 uses the Ethereum JSON-RPC-2.0 protocol to communicate with the firewall server 1209. The off-site application server 1217 communicates with the firewall server 1209 using equivalent RPC calls and responses to those used to communicate with a blockchain node. The off-site application server 1217 provides access management services on behalf of the user of the first off-site user device 1213, which include managing Ethereum key pairs and requesting access tokens from the private IdP 1216 and the public IdP 1218. In this example, access tokens are used to provide identity information to the firewall server 1209 on behalf of users, including the user of first off-site user device 1213. The private IdP 1216 stores a list of users associated with accounts on the private blockchain 1203, along with blockchain addresses of the associated accounts. The off-site application server 1217 also communicates with a taxonomy server 1212, which provides taxonomy services that include modelling attributes of users. The taxonomy server 1212 in this example is a GraphQL server. Second off-site user device 1215 is configured with a browser-based Decentralised Application (DApp), and communicates with the firewall server 1209 using the Ethereum JSON-RPC-2.0 protocol. Second off-site user device 1215 performs access management locally using a locally-managed wallet containing an Ethereum key pair and having associated Ether.

The firewall server 1209 processes data contained within RPC responses sent from nodes of the private blockchain 1209 to the off-site application server 1217, or sent from nodes of the private blockchain 1209 to second off-site user device 1215. Examples of processing data contained within an RPC response include redacting the data and hashing the data, as will be described hereafter.

Figure 13:
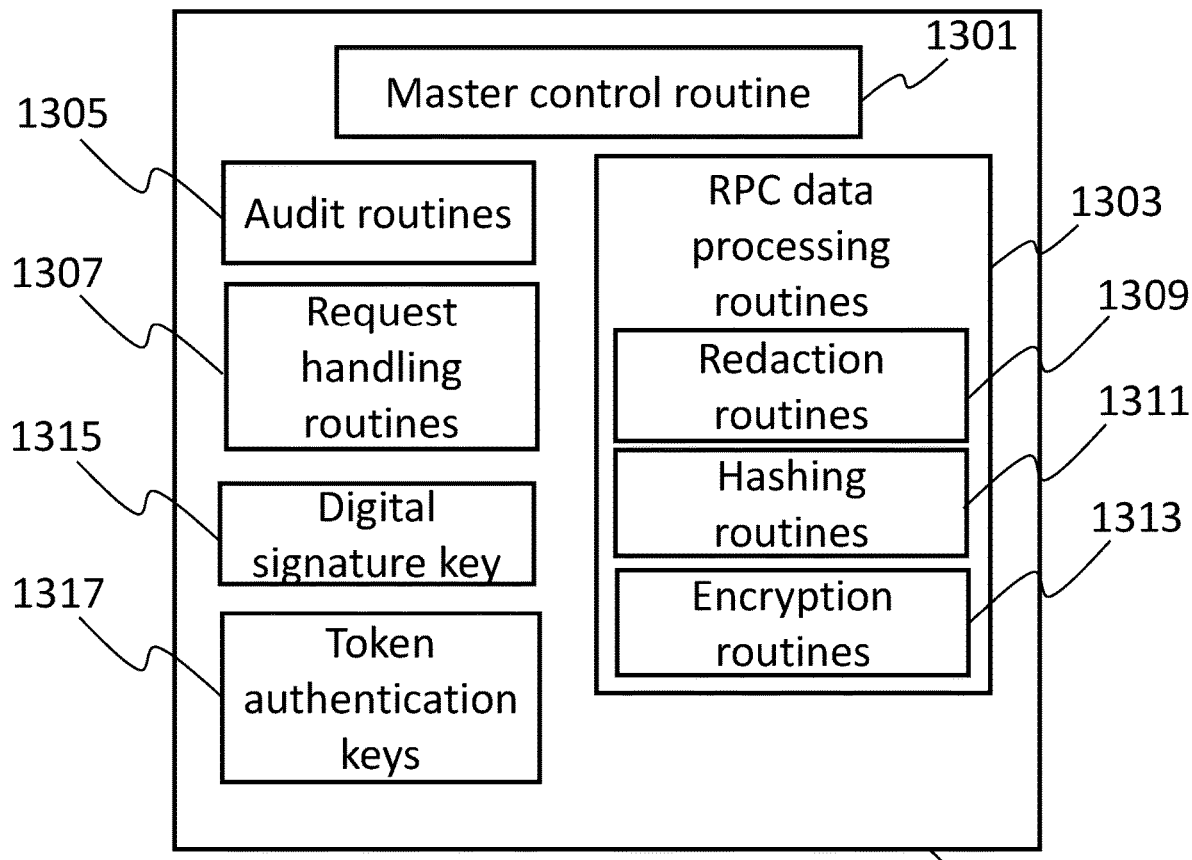
FIG. 13 is a block diagram representing a firewall server in the system of FIG. 12.

As shown in FIG. 13, the firewall server 1209 stores a master control routine 1301. The master control routine 1301 is configured to call subroutines including RPC data processing routines 1303, audit routines 1305, and request handling routines 1307. The RPC data processing routines 1303 include redaction routines 1309, hashing routines 1311, and encryption routines 1313. The master control routine 1301 calls the RPC data processing routines 1303 in order to process data contained within RPC responses sent from nodes of the private blockchain 1203 to the off-site application server 1217, or to the second off-site user device 1215. The master control routine 1301 calls the request handling routines 1307 in response to receiving RPC requests from off-site application server 1217, or the second off-site user device 1215. The firewall server 1209 further stores a digital signature key 1315, which is a private cryptographic key used for signing RPC responses. The firewall server 1209 further stores a token authentication key 1317, which is used for authenticating access tokens received from the private IdP 1216, as will be described hereafter.

Figure 14:
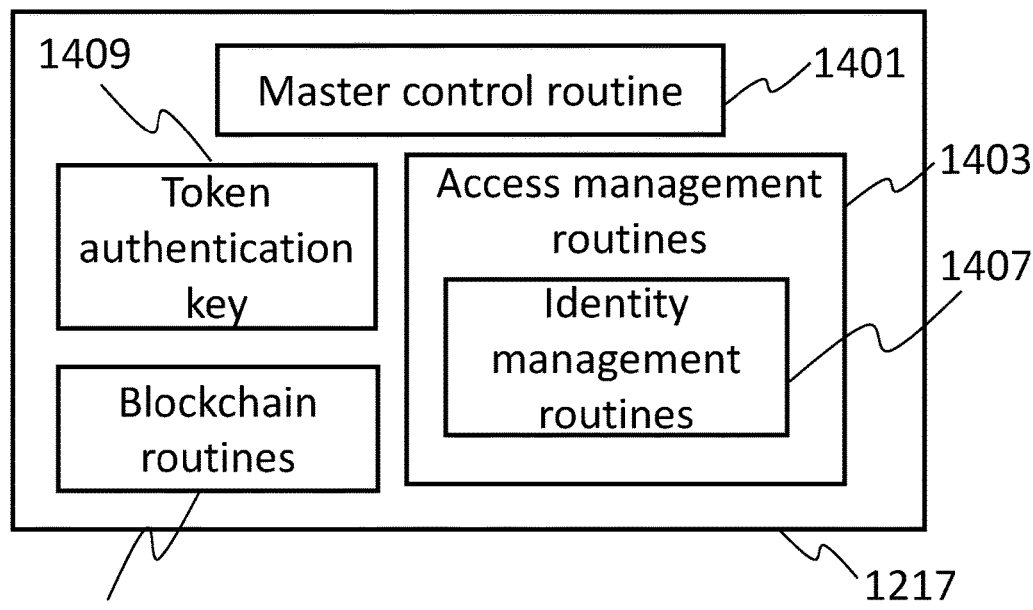
FIG. 14 is a block diagram representing an off-site application server in the system of FIG. 12.

As shown in FIG. 14, the off-site application server 1217 stores a master control routine 1401. The master control routine 1401 is configured to call subroutines including access management routines 1403 and blockchain routines 1405. The access management routines 1403 include identity management routines 1407. The master control routine 1401 calls the identity management routines 1407 in order to request access tokens from the private IdP 1216 and the public IdP 1218, and to authenticate access tokens from the public IdP 1218. The master control routine is configured to call the blockchain routines 1405 in order to send requests to the firewall server 1209 to invoke methods on the private blockchain 1203. The off-site application server 1217 further stores token authentication keys 1409, which are used for authenticating access tokens received the public IdP 1218.

Figure 15:
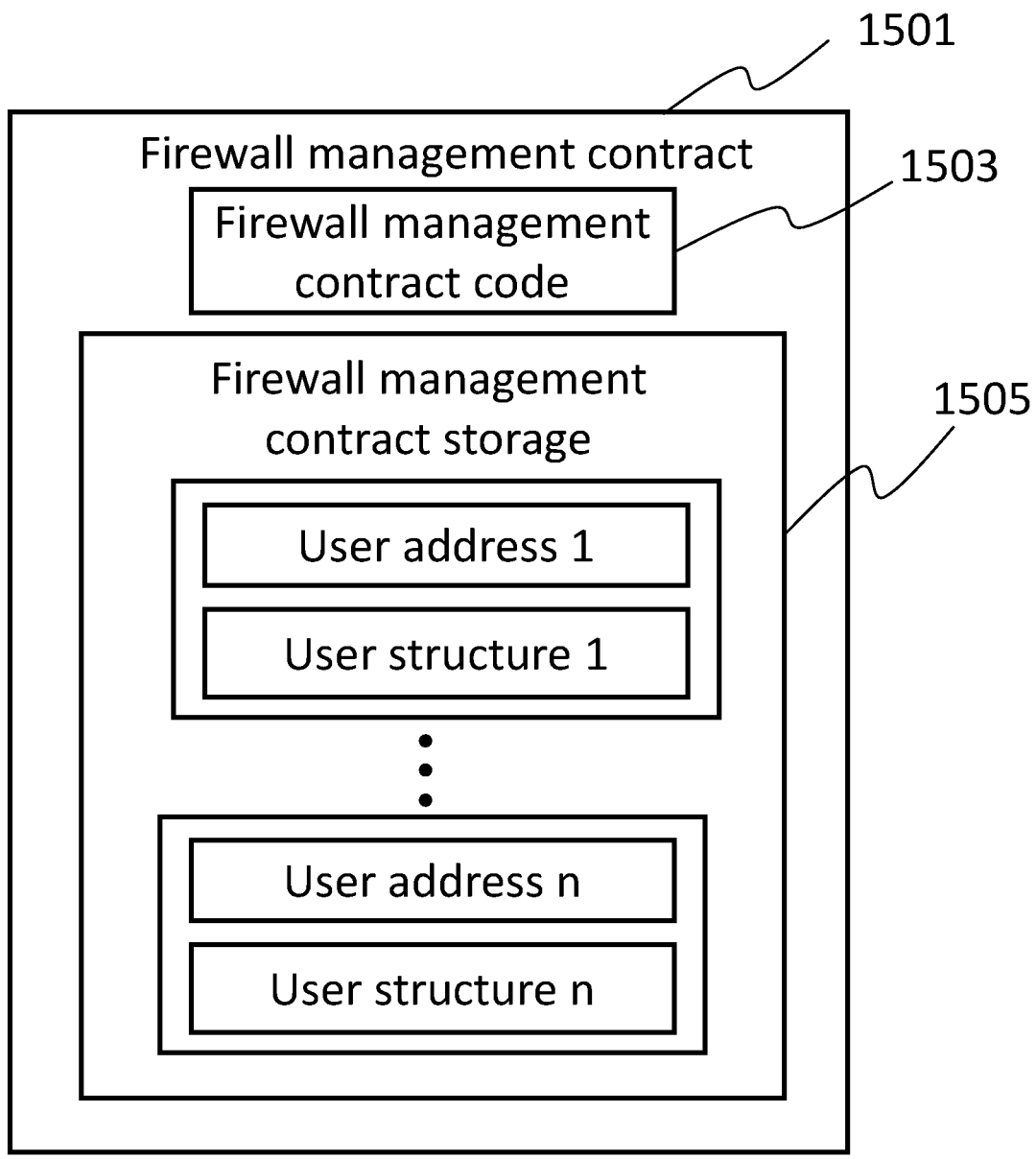
FIG. 15 is a block diagram representing a firewall management contract stored on the private blockchain of FIG. 12.

FIG. 15 shows an example of a firewall management contract 1501 stored on the nodes of the private blockchain 1203. The firewall management contract 1501 contains firewall management contract code 1503 and firewall management contract storage 1505. The firewall management contract storage 1505 includes, for each user associated with an account on the private blockchain 1203, the blockchain address of the user account and an associated data structure for the user. The associated data structure for the user includes data indicative of global and asset-specific filter rules associated with the user. Filter rules are used by the firewall server 1209 to determine whether to process RPC response data received from the private blockchain 1203 in advance of sending to an RPC response to the off-site application server 1217 or the second off-site user device 1215. Examples of filter rules that may be associated with a user are:

global read access allow—allows the associated user to access data stored on any asset contract stored on the blockchain;

asset-specific read access allow—allows the associated user to access data stored by a specific asset contract;

redaction on method responses—allows the associated user to access a subset of the data stored by a specific asset contract;

redaction on events—allows the associated user to query a subset of events from a specific asset contract;

encryption on method responses—allows the associated user to access data stored by a specific asset contract, and encrypts the returned data;

encryption on events—allows the associated user to query a subset of events from a specific asset contract, and encrypts the returned data.

In this example, the associated data structure for each user includes vTrust level data. The vTrust level data includes a global vTrust level for the user, and may include asset-specific vTrust levels for the user. As will be described in more detail hereafter, the vTrust levels of an asset and/or certification may be compared with vTrust levels of a user in order to determine whether a user of an off-site user device is permitted to view evidence associated with a certification of an asset.

Other filter rules are envisaged relating to processing of RPC response data. In this example, the default filter rule for a user is to deny access to data stored by any asset contract stored on the private blockchain 1203. For cases in which the firewall management contract 1501 specifies filter rules for a user, the least restrictive filter rule for a given asset contract takes precedent.

Figure 16:
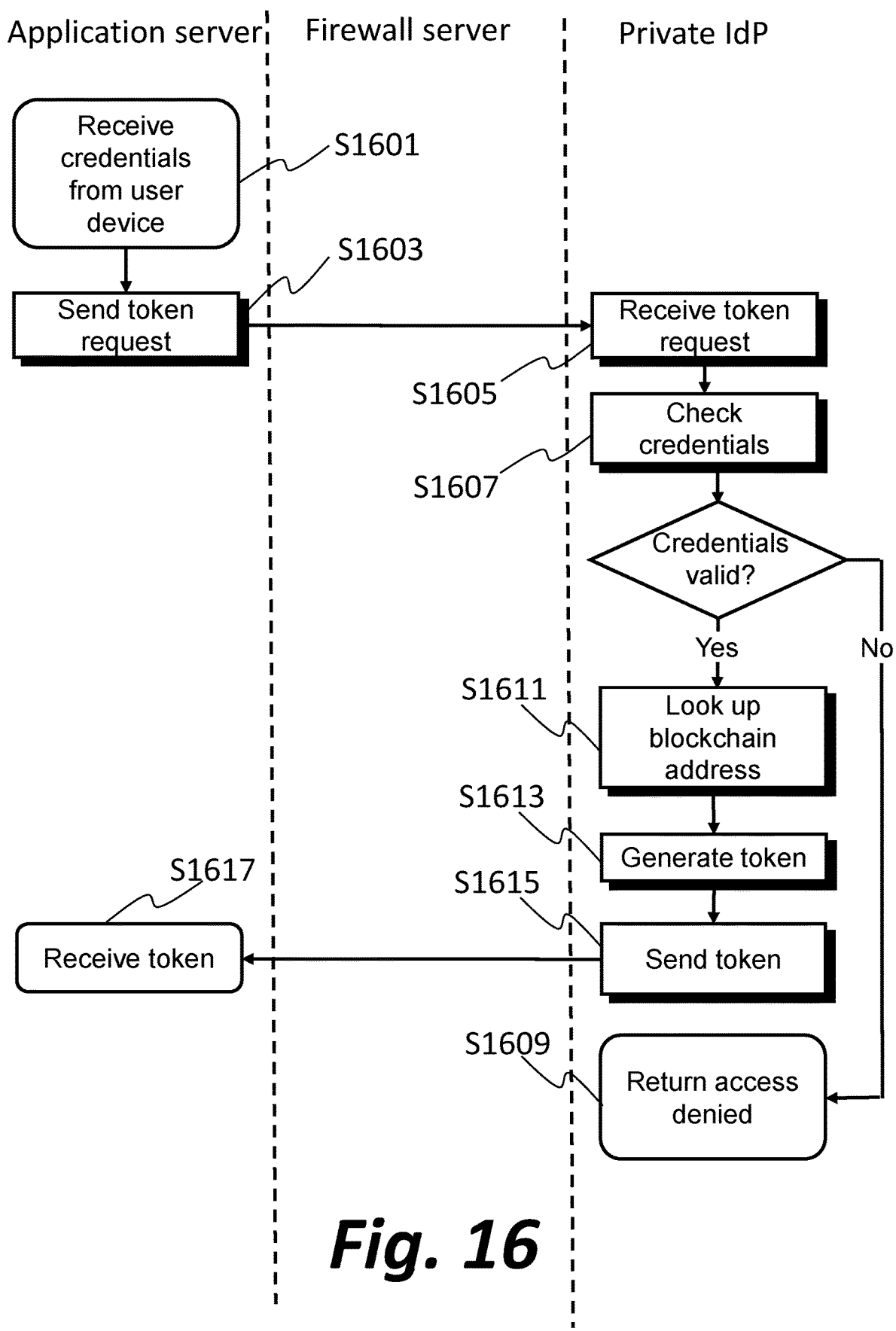
FIG. 16 is a flow diagram representing a routine for accessing data stored on a private blockchain.

FIG. 16 shows an example in which the off-site application server 1217 requests an access token for access to the firewall server 1209 on behalf of a user. The off-site application server 1209 receives, at S1601, credentials from the first off-site user device 1213. In this example, the credentials include a username and a password. The off-site application server 1209 requests, at S1603, an access token from the private IdP 1216. The request includes the credentials received at S1601. After receiving the access token request at S1605, the private IdP 1216 checks, at S1607, whether the credentials are valid. If the credentials are not valid, the private IdP 1216 sends, at S1609, a response to the application server indicating that access to the firewall server 1209 is denied. In this example, the response is an HTTP 303 Forbidden response indicating that no further action will be taken by the off-site application server 1217 regarding the request for firewall access.

If the credentials are valid, the private IdP 1216 looks up, at S1611, a blockchain address of an account associated with the user. The private IdP 1216 then generates, at S1613, an access token. In this example, the access token is a JWT. The JWT includes header, payload, and signature fields. The private IdP 1216 uses a cryptographic key to generate the signature of the JWT by applying a hashing algorithm to data including the cryptographic key and a concatenation of the header and the payload. In this example, the HMAC-SHA256 algorithm is used. In other examples, other hashing algorithms may be used. In some examples, the hashing algorithm is specified in the header of the JWT. In this example, the payload field of the JWT includes the blockchain address looked up a S1611.

The private IdP 1216 sends, at S1615, the generated access token to the off-site application server 1217. The off-site application server 1217 receives the generated access token at S1617. The off-site application server 1217 includes the access token in subsequent RPC requests sent to the firewall server 1209. As mentioned above, the firewall server 1209 maintains a token authentication key 1317 corresponding to the cryptographic key used by the private IdP 1216 to generate the signature of the access token, and therefore by applying the same hashing algorithm to the concatenation of the header and payload of the access token, the firewall server 1209 is able to verify the signature and hence verify that the access token was generated by the private IdP 1216 and has not been modified (for example, by a malicious third party).

In the example of FIG. 16, a user logs into the off-site application server 1217 with first off-site user device 1213 in order to request access to data stored on the private blockchain 1203. In another example, a user requests access to data stored on the private blockchain 1203 with second off-site user device 1215 using a browser-based DApp. In this example, the steps performed by the off-site application server 1217 in FIG. 16 are performed by second off-site user device 1215.

Figure 17:
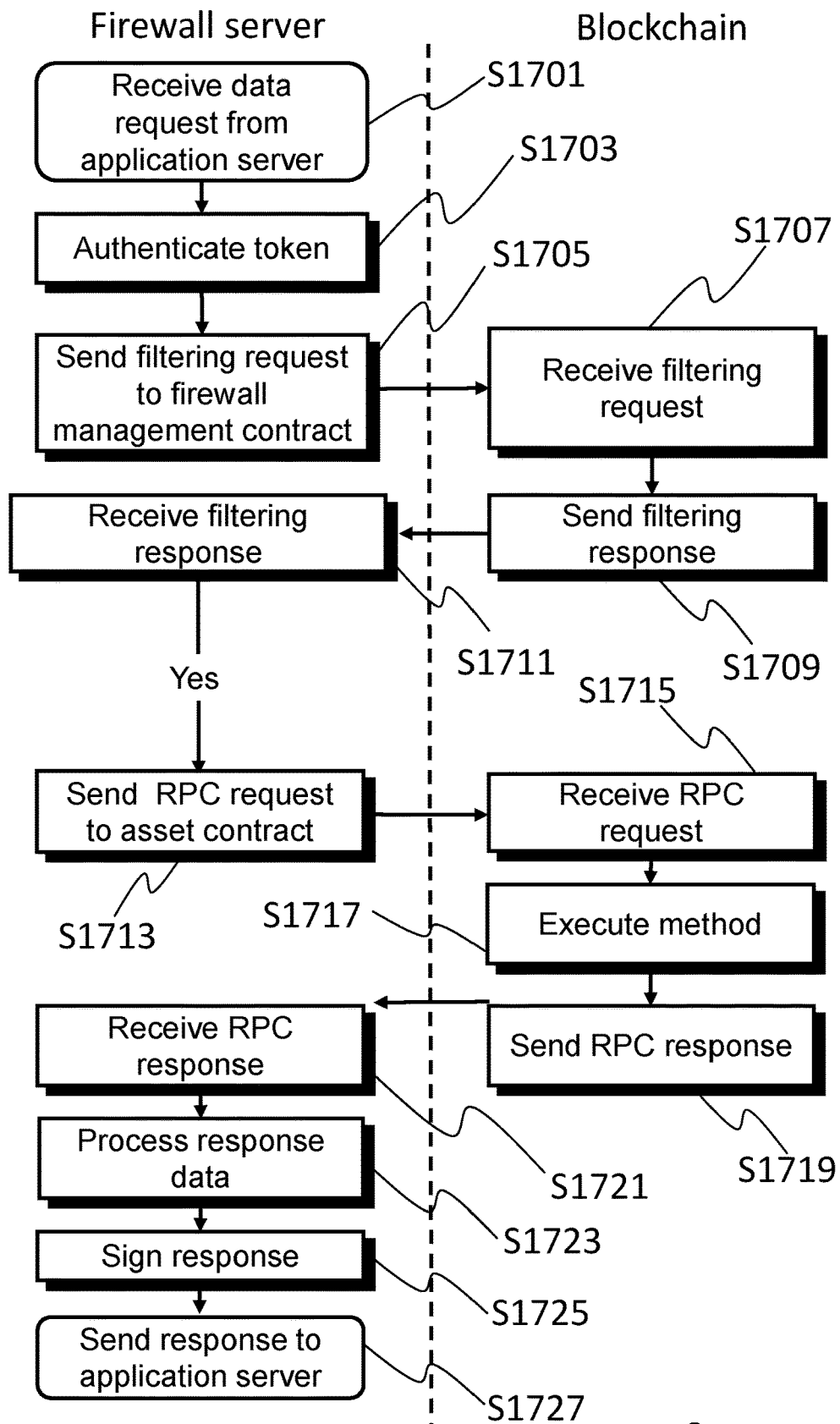
FIG. 17 is a flow diagram representing a routine for processing data stored on a private blockchain.

FIG. 17 shows an example in which the firewall server 1209 accesses, on behalf of a user of first off-site user device 1213, data stored on an asset contract on the private blockchain 1203. The firewall server 1209 receives, at S1701, a request for data in the form of an RPC request from the off-site application server 1217. In this example, the requested data includes a list of the blockchain addresses corresponding to users associated with an asset corresponding to an asset contract stored on the private blockchain 1203. In other examples, other data may be requested from contracts stored on the private blockchain 1203. In this example, the RPC request is an eth_call request operable to invoke a constant method on the private blockchain 1203. The RPC request includes an access token generated by the private IdP 1216, as described above with reference to FIG. 16, the access token including a blockchain address of an account associated with the user requesting data.

The firewall server 1209 authenticates, at S1703, the access token. The firewall server sends, at S1705, a filtering request in the form of an RPC request to one of the nodes of the private blockchain, specifying the firewall management contract 1501 on the private blockchain 1203 as a recipient address. The filtering request includes the blockchain address associated with the user requesting data. As discussed above, the firewall management contract 1501 stores a list of blockchain addresses associated with users, and for each stored blockchain address of a user, the firewall management contract 1501 stores an associated set of filter rules.

The firewall management contract 1501 receives, at S1707, the filtering request from the firewall server 1209. The filtering request causes the firewall management contract 1501 to search for filter rules corresponding to the user. The firewall management contract 1501 contract sends, at S1709, a filtering response to the firewall server 1209. The filtering response indicates whether the user is authorised to access the requested data, and whether the firewall server 1209 is required to process the requested data before it is returned to the user. Examples of the firewall server processing the requested data include hashing, encrypting, rewriting, and redacting the data.

The firewall server receives, at S1711, the filtering response. The firewall server sends, at S1713, an RPC request to a node of the private blockchain 1203, specifying the asset contract as a recipient address. In response to receiving the RPC request at S1715, the asset contract executes, at S1717, a method specified by the RPC request. In this example, the asset contract returns the blockchain addresses of all users associated with the asset corresponding to the asset contract. The asset contract sends, at S1719, an RPC response to the firewall server 1209.

Having received the RPC response at S1721, the firewall server 1209 processes the response data at S1723. In this example, processing the response data includes redacting the response data such that the redacted response data corresponds to a subset of the data included in the RPC response.

The firewall server 1209 signs the RPC response, at S1725, using the digital signature key 1315. The digital signature key 1315 in this example is a private key and has a corresponding public key made available to the off-site application server 1217 (and also available to users by other means, for example on a website maintained by the corporate entity operating the on-site components). This allows the off-site application server 1217 to verify that the RPC response received from the firewall server 1209 originated from the firewall server 1209 and has not been altered, for example by a malicious third party. In this example, the digital signature is included in an HTTP response header of the RPC response. In other examples, a digital certificate may instead be included in an HTTP response header, which would similarly allow the off-site application server 1217 to verify that the RPC response received from the firewall server 1209 originated from the firewall server 1209 and has not been altered. The firewall server 1209 sends, at S1727, the processed, signed response to the off-site application server 1217 such that the user of first off-site user device 1213 may access the processed response data.

In the present example, the firewall server 1209 sends, to the audit server 1211, data corresponding to each attempt by a user of an off-site device to access data on the private blockchain 1213. The audit server 1211 thereby maintains a record of any such attempts, which is accessible to the corporate entity operating the on-site components.

In the example above, a user of first off-site user device 1213 requests data from the private blockchain 1203 via the off-site application server 1217. In another example, a user of second off-site user device 1215 requests data from the private blockchain 1203 using a browser-based DApp.

Public/Private Chain System

In some examples, a control contract and asset contracts may be deployed on a public distributed ledger as described above. A second control contract and asset contracts may also be deployed on a private distributed ledger controlled by a private entity, for example a corporate entity, where some of the asset contracts on the private distributed ledger correspond to some of the asset contracts on the public distributed ledger. A user (for example, an employee of the private entity) may be associated with a user account on the public distributed ledger and also with a user account on the private distributed ledger. The user may be certified on the private distributed ledger as being associated with an asset, and may wish to advertise the certification to certain users outside the private entity. As discussed above, access to data stored on the private distributed ledger is controlled by the private entity, but the private entity may permit certain users from outside the private entity (for example, contractors or associates) to view the certification, along with corresponding evidence data relating to the certification.

Figure 18:
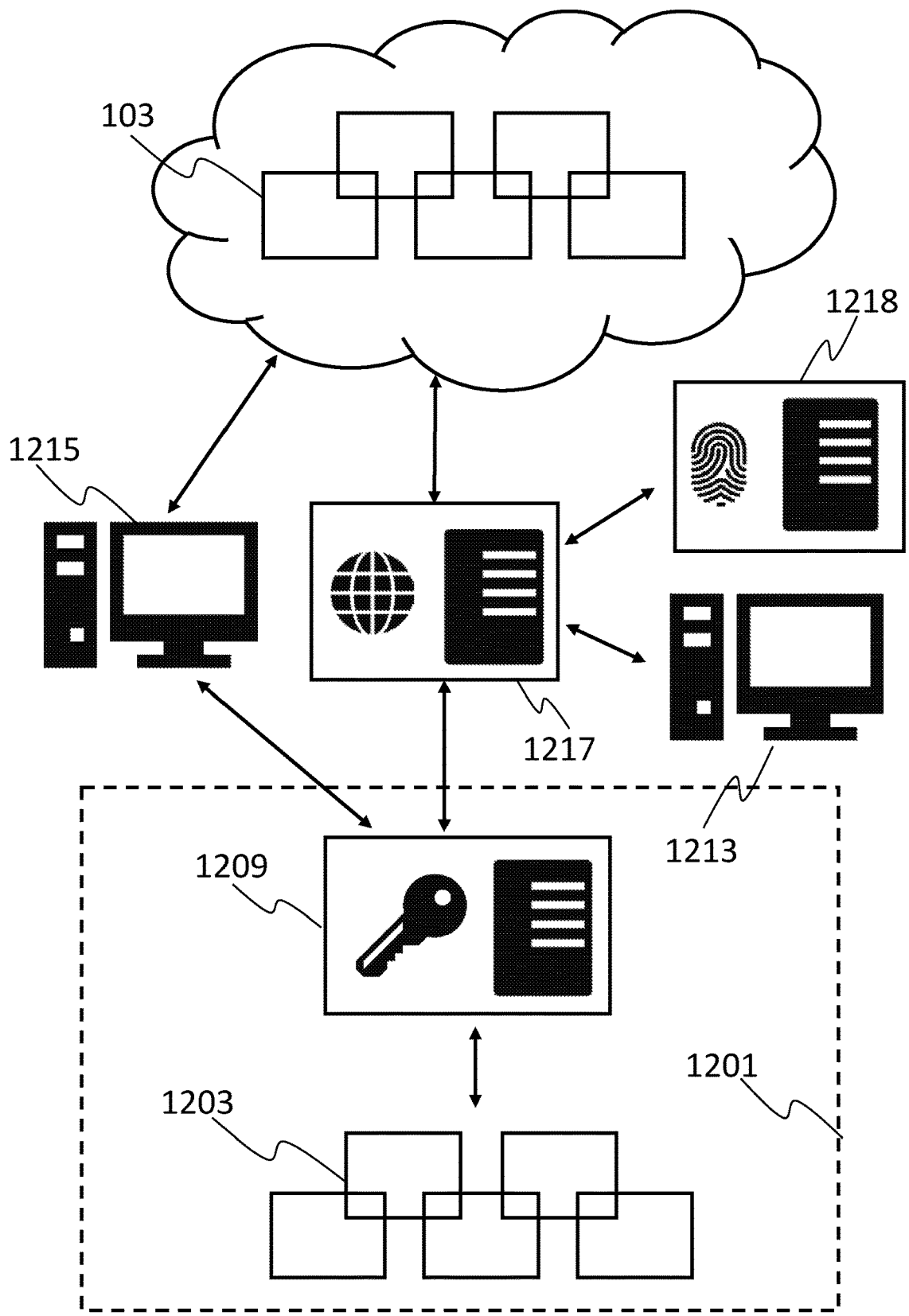
FIG. 18 is a schematic diagram of a system for storing and processing data on private and public blockchains.

FIG. 18 shows an extension of the system of FIG. 12 for storing and processing data in accordance with the present invention. The system includes all of the off-site and on-site components of FIG. 12. Of the on-site components, the public chain 1203 and the firewall server 1209 are shown. Of the off-site components, the first off-site user device 1213, the second off-site user device 1215, the off-site application server 1217, and the public IdP 1218 are shown. Additionally, in this example the off-site application server 1217 and the second off-site user device 1215 are each configured to communicate with the public blockchain 103. The public IdP 1218 stores a list of users associated with accounts on the public blockchain 103, along with blockchain addresses of the associated accounts.

As mentioned above with reference to FIG. 4, the control contract 401 on the public blockchain 103 has a record 407 of registered private blockchains, including the private blockchain 1203. In this example, the record 407 includes a name of the private blockchain 1203, a hash of the genesis block of the private blockchain 1203, a set of public IP addresses at which the private blockchain 1203 can be reached (in this example, a set of IP addresses at which the firewall server 1209 can be reached, and additionally a set of IP addresses at which the private IdP 1216 can be reached), and the blockchain address of a control contract stored on the private blockchain 1203. In other examples, other information identifying a private blockchain may be stored instead of, or as well as, a hash of a genesis block.

Each time a private blockchain is registered, a registration event is written to the public blockchain 103. It is possible for users to query these registration events, and thus to receive information about the registered private blockchains. Furthermore, the owner of the control contract 401 may associate a user account on the public blockchain 103 with an address on one or more registered private blockchains, such as private blockchain 1203. When the owner associates a private blockchain address with a public blockchain address in this way, an event is created on the public blockchain 103. These events can then be queried, so that it is possible to find information indicative of any registered private chain addresses associated with a user having an account on the public chain 103. In other examples, instead of using events to record information associating private chain accounts of a user with a public chain account of a user, a user structure stored by a control contract on a public blockchain may include data indicative of private chain addresses associated with the user.

In addition to events that record information associating private blockchain addresses with public blockchain addresses, events may be written to the public blockchain 103 indicating that evidence had been certified on a private blockchain. Such events are referred to as proxy certifications. A proxy certification is an event written to the public blockchain 103, indicating that a user is certified as being associated with an asset corresponding to an asset contract stored on a private blockchain. A proxy certification includes the public blockchain address of the user, as well as the name of the registered private blockchain on which the associated asset contract is stored and an address of the associated asset contract on the registered private blockchain. Proxy certifications on the public blockchain 103 may be queried in order to determine whether a user associated with an account on the public blockchain 103 has been certified as being associated with an asset on a private blockchain.

Figure 19A:
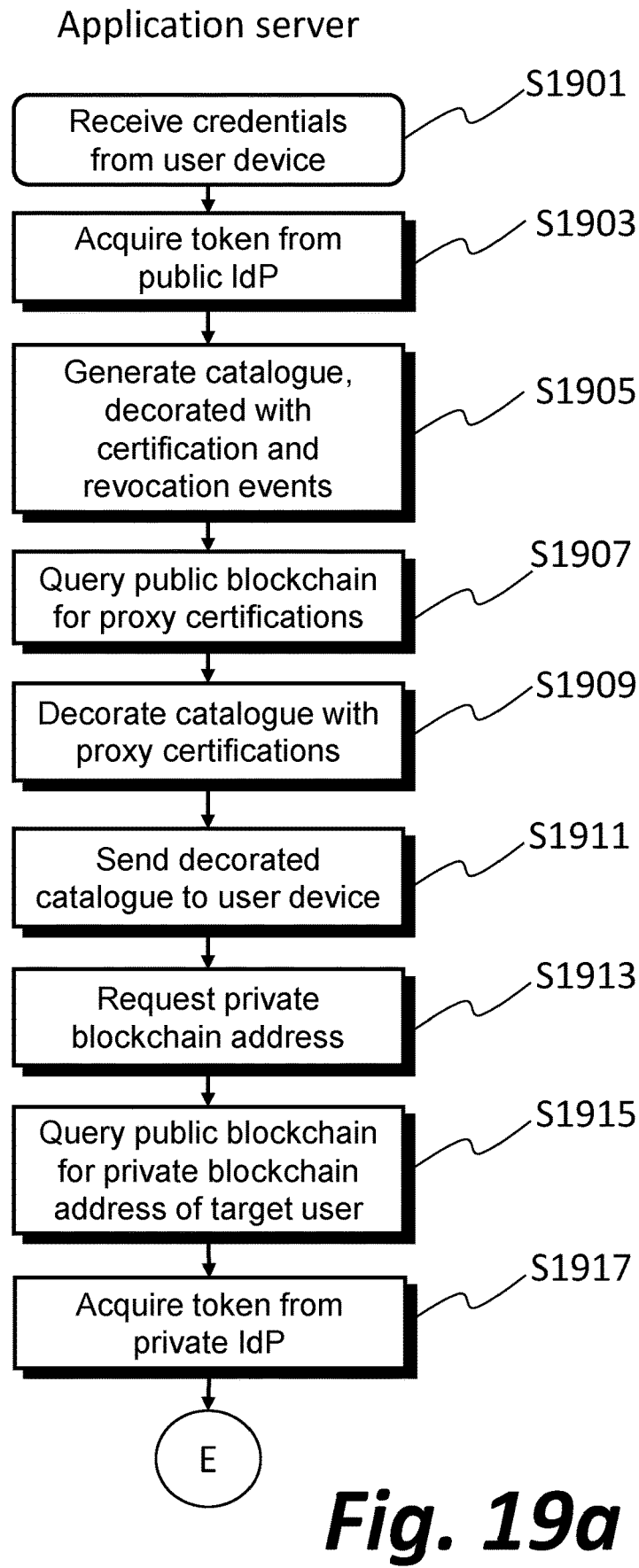
FIGS. 19a and 19b is a flow diagram representing a routine for accessing data stored on public and private blockchains.
Figure 19B:
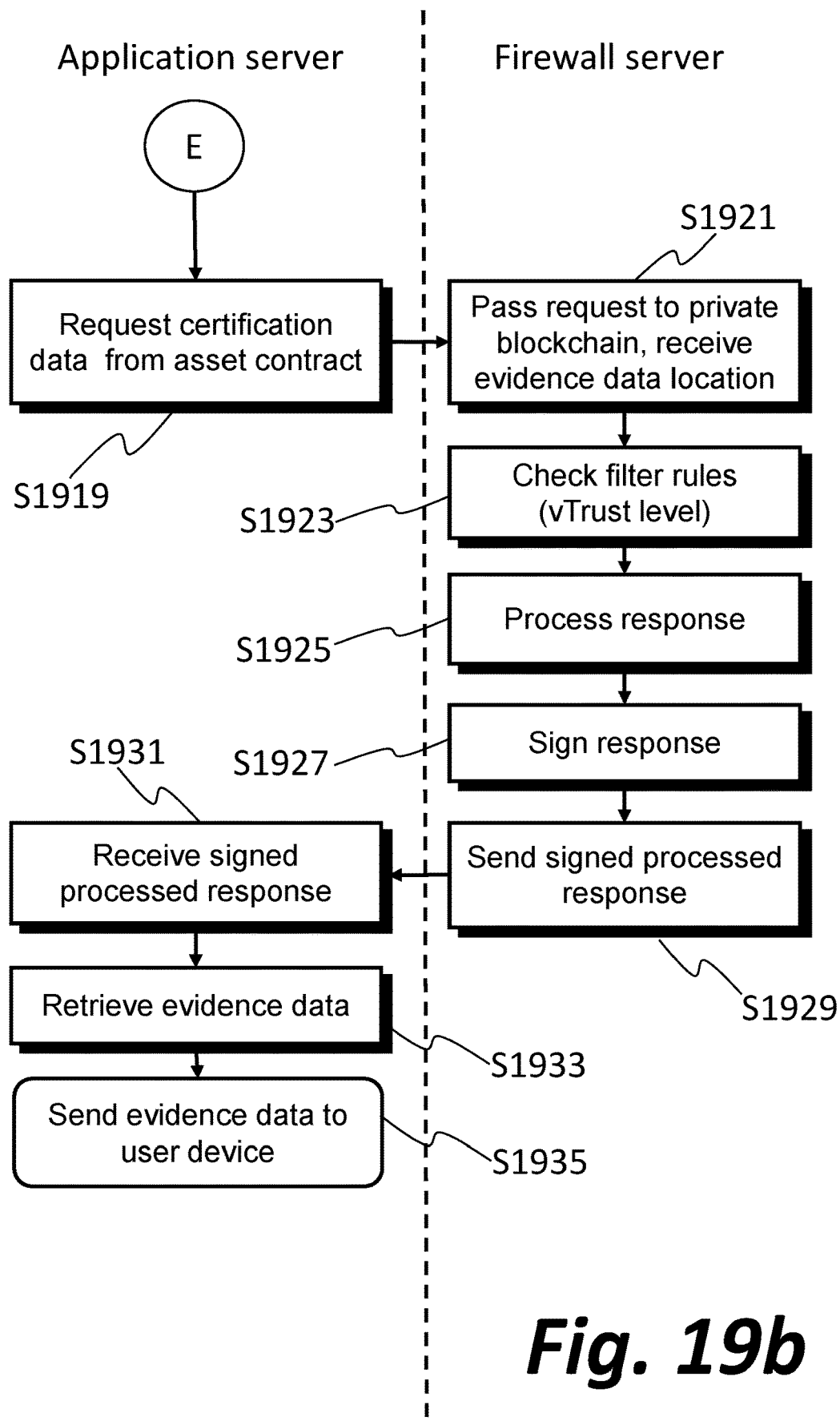

In the example of FIG. 19, the off-site application server 1217 generates a catalogue of assets on behalf of a current user of first off-site user device 1213, where the current user has an associated user account on the public blockchain 103, and also has an associated user account on the registered private blockchain 1203. The asset catalogue is decorated with certification events and revocation events corresponding to a target user that is of interest to the current user. The current user selects the target user from the list of users maintained by the public IdP 1218. In this specific example, the current user is a prospective employer and the target user is a prospective employee.

The off-site application server 1217 receives, at S1901, credentials from first off-site user device 1213, the credentials corresponding to the current user of first off-site user device 1213. The off-site application server 1217 acquires, at S1903, an access token from the public IdP 1218. As mentioned above, the public IdP 1218 stores a list of users associated with accounts on the public blockchain 103, along with blockchain addresses of the associated accounts. Acquiring the access token from the public IdP 1218 involves a routine equivalent to that of FIG. 5, and accordingly the acquired access token includes the address of the user account associated with the current user on the public blockchain 103.

Having acquired the access token from the public IdP 1218, the off-site application server 1217 generates, at S1905, a decorated catalogue of assets corresponding to the target user. Generating a decorated catalogue of assets involves a routine similar to that of FIG. 6. The certification and revocation events in this example are filtered according to the blockchain address of the target user. The application server next queries, at S1907, the public blockchain 103 for proxy certifications. The proxy certifications returned in response to the query are filtered according to the public blockchain address associated with the target user. The off-site application server 1217 decorates, at S1909, the catalogue using the proxy certifications, such that entries of the catalogue corresponding to assets also indicate whether a proxy certification corresponding to the target user exists on the public blockchain 103. The off-site application server 1217 sends, at S1911, the decorated catalogue of assets to first off-site user device 1213.

In this example, having received the decorated catalogue of assets, the current user of first off-site user 1213 device requests to view certification data stored on the private blockchain 1203 associated with a certification having a corresponding proxy certification on the public blockchain 103. In response to a request from first off-site user device 1213, indicating that the current user requests to view the certification data, the off-site application server 1217 sends an RPC request, at S1913, to the control contract 401 stored on the public blockchain 103, requesting a set of public IP addresses at which the private blockchain 1203 can be reached, along with the blockchain address of a control contract stored on the private blockchain 1203. The RPC request includes the name of the registered private blockchain 1203, as indicated by the proxy certification. The control contract 401 returns a set of public IP addresses at which the firewall server 1209 can be reached, along with the blockchain address of the control contract stored on the private blockchain 1203. In this example, the control contract 401 further returns a set of public IP addresses at which the private IdP 1216 can be reached.

The off-site application server 1217 queries, at S1915, the public blockchain 103 for an address on the private blockchain 1203 of a user account associated with the target user. As discussed above, this is made possible by the fact that when the owner of the control contract 401 associates a private blockchain address of a user account with a public blockchain address of a user account, an event is created on the public blockchain 103.

Having acquired sets of public IP addresses at which the firewall server 1209 and the private IdP 1216 can be reached, along with the private blockchain address of a control contract on the private blockchain 1203, the off-site application server 1217 acquires, at S1917, an access token for access to the firewall server 1209. Acquiring an access token for access to the firewall server 1209 involves a routine equivalent to that of FIG. 16 and in this example requires the current user to enter a set of credentials for access to the firewall server 1209. As mentioned above, the private IdP 1216 stores a list of users associated with accounts on the private blockchain 1203, along with blockchain addresses of the associated accounts.

The off-site application server 1217 sends, at S1919, an RPC request with the asset contract on the private chain 1203 specified as a recipient, requesting certification data corresponding to the proxy certification. The RPC request includes the access token acquired from the private IdP 1216 at S1917. The firewall server 1209 authenticates the access token using a token authentication key 1317 and sends, at S1921, a corresponding RPC request to the private blockchain 1203. The asset contract sends an RPC response to the firewall server 1209 including certification data indicative of a certification of evidence data. In this example, the certification data includes the location of the evidence data in the on-site evidence store 1207.

The firewall server 1209 queries, at S1923, the filter rules specified by the firewall management contract 1501. In particular, the firewall server 1209 queries the firewall management for the global and asset-specific vTrust levels of the current user. The firewall server 1209 also queries the asset contract for vTrust level of the certification corresponding to the proxy certification. As discussed above, each certification on the private blockchain 1203 has an associated vTrust level, which is a minimum vTrust level that must be assigned to a user of an off-site user device in order for the user to view evidence corresponding to a certification on the private blockchain 1203. In this example, the asset-specific vTrust level of the current user is at least as high as the vTrust level for the certification to which the proxy certification corresponds, and the current user is therefore permitted to view the evidence data.

The firewall server 1209 processes, at S1925, the RPC response data received from the asset contract in accordance with the filter rules. As mentioned above, in this example the current user has a sufficiently high vTrust level to be permitted to view the evidence data, and hence processing the RPC response data does not include total redaction of the response data. In this example, processing the response data includes rewriting the response data such that data indicative of the location of the evidence data (in this example, a URL corresponding to a location in the on-site data store 1207) is substituted for a URL associated with an on-site proxy server (not shown) that is accessible by the off-site application server 1217, and through which the application server 1217 may access the evidence data. In another example, a current user does not have a sufficient vTrust level to be permitted to view evidence data, and processing the response data includes redaction such that the location of the evidence data is not included in the processed response data.

The firewall server 1209 signs, at S1927, the processed RPC response using the digital signature key 1315 and sends, at S1929, the signed, processed RPC response to the off-site application server 1217. The off-site application server 1217 receives the signed, processed RPC response at S1931.

In this example, the off-site application server 1217 retrieves, at S1933, the evidence data from the location indicated in the signed, processed RPC response. As mentioned above, the indicated location is a URL associated with the on-site proxy server through which the off-site application server may access the evidence data. The application server 1217 sends, at S1935, the retrieved evidence data to first off-site user device 1213, such that the current user can view the evidence data to which the proxy certification corresponds. In other examples, the step of retrieving evidence data is omitted.

Figure 20:
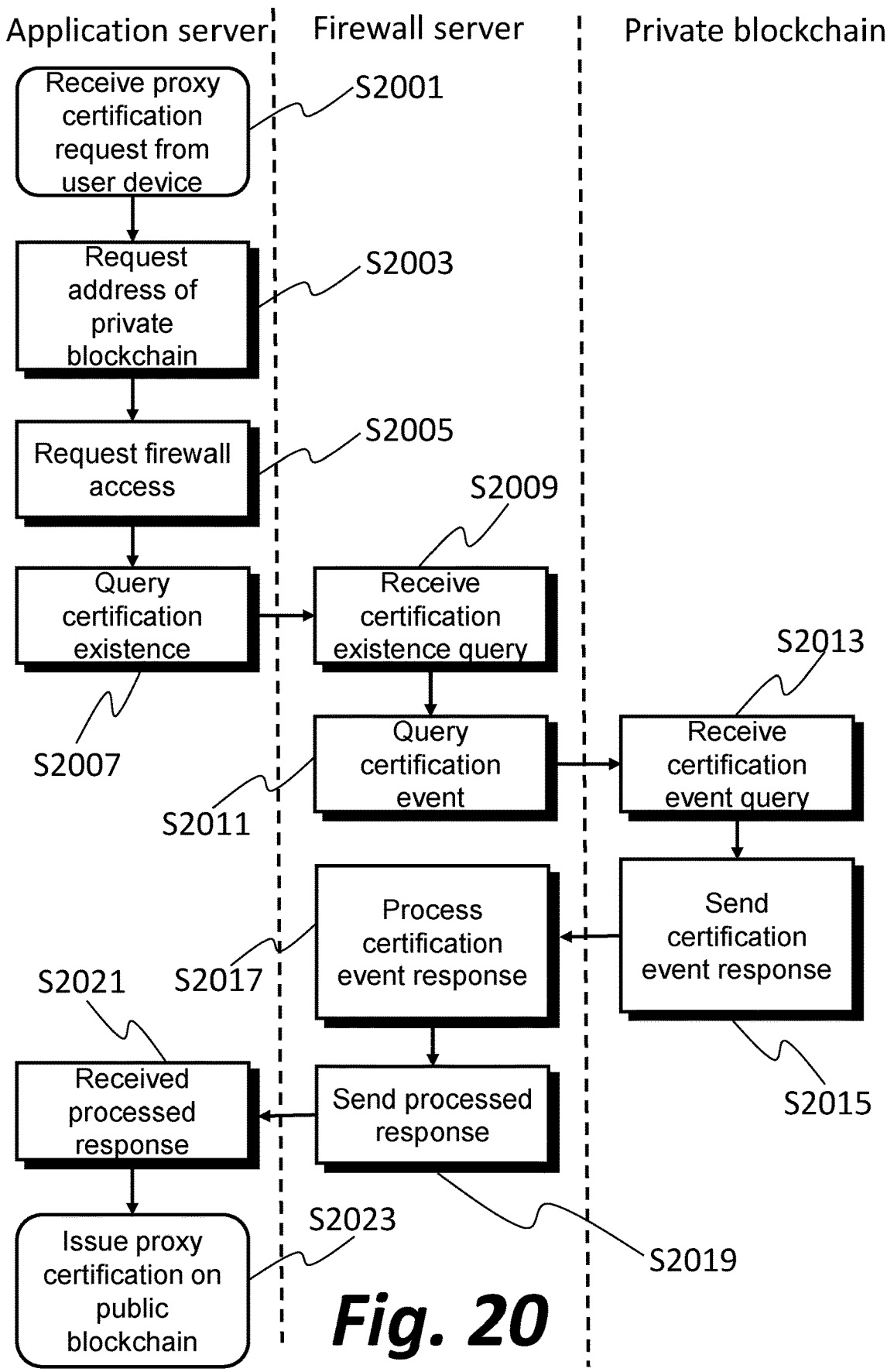
FIG. 20 is a flow diagram representing a routine for issuing a proxy certification on a public blockchain.

FIG. 20 shows an example in which the off-site application server 1217 requests a proxy certification corresponding to a certification of an asset contract on the private blockchain 1203, on behalf of a user of first off-site user device 1213. The off-site application server 1217 receives, at S2001, a proxy certification request from the first off-site user device 1213. The proxy certification request includes data indicative of the private blockchain 1203 on which the user alleges a certification has been performed, and an address on the private blockchain 1203 of an asset contract to which the alleged certification relates. In this example, the proxy certification request includes the name of the private blockchain 1203. The off-site application server 1217 sends an RPC request, at S2003, to the control contract 401 stored on the public blockchain 103, requesting a set of public IP addresses at which the private blockchain 1203 can be reached. As described above, the set of public IP addresses in this example is a set of public IP address at which the firewall server 1209 can be reached.

Having received an IP address at which the private blockchain 1203 may be reached, the off-site application server 1217 requests, at S2005, access to data stored on the private blockchain 1203 via the firewall server 1209. In this example, a routine equivalent to the routine of FIG. 16 is used to grant firewall access and to provide the firewall server 1209 with a blockchain address associated with the user. The off-site application server 1217 queries, at S2007, the existence of a certification on the private blockchain 1203. Having received the query at S2009, the firewall server 1209 queries, at S2011, the private blockchain 1203 for a certification event indicating that the alleged certification exists. The private blockchain 1203 receives the query at S2013. The private blockchain 1203 sends, at S2015, a certification event response indicating that the alleged certification event exists on the private blockchain 1203.

The firewall server 1209 processes, at S2017, the certification event response depending on the filter rules of the firewall server. In some examples, the filter rules may include total redaction of the response such that no data indicative of the certification is returned to the application server. In this example, no redaction is performed and the firewall server 1209 sends, at S2019, processed response data to the application server 1217. The off-site application server 1217 receives the processed response data at S2021. Having received the processed response data, indicating that the alleged certification exists on the private blockchain 1203, the off-site application server 1217 sends, at S2023, an RPC request to a node of the public blockchain 103, the request having the address of a corresponding asset contract on the public blockchain 103 as a recipient address. The RPC request causes the asset contract to issue a proxy certification event on the public blockchain 103.

The above embodiments are to be understood as illustrative examples of the invention. Further embodiments of the invention are envisaged, for example, the distributed ledger may be based on a Hyperledger blockchain. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The content of this description contains the following numbered clauses:

A data processing system comprising:
 a plurality of computing nodes configured to host a distributed ledger;
 a computing device communicatively coupled with one of the computing nodes; and
 a data store communicatively coupled with the computing device,
 wherein the distributed ledger comprises:
  a plurality of user accounts, each of the plurality of user accounts having an address on the distributed ledger; and
  one or more asset contracts, each of the one or more asset contracts having an address on the distributed ledger,
 wherein the computing device is operable to provide association data to a first asset contract of the one or more asset contracts, the provided association data comprising:
  an address on the distributed ledger of a first user account of the one or more user accounts; and
  data indicative of a first data location in the data store, and
 wherein the first asset contract is arranged to:
  store the provided association data; and
  in response to a query indicating the first user account, return the data indicative of the first data location, thereby to enable access to data stored at the first data location.

2. The system of clause 1, operable to certify association data stored by a second asset contract of the one of more asset contracts, the association data stored by the second asset contract comprising:
 an address on the distributed ledger of a second user account of the one or more user accounts; and
 data indicative of a second data location in the data store,
 wherein certifying the association data stored by the second asset contract comprises the computing device:
  sending a first request to the second asset contract for the data indicative of the second data location, the first request conveying data indicating the second user account;
  retrieving data from the indicated second data location for certification by a first current user of the computing device; and
  in response to an input from the first current user indicating certification of the data retrieved from the second data location, sending a second request to the second asset contract, the second request conveying data indicating certification of the data retrieved from the second data location, and
 wherein certifying the association data stored by the second asset contract further comprises the second asset contract updating, in response to receiving the second request, the association data stored by the second asset contract to indicate that an association of the second user account with data stored at the second data location is certified.

The system of clause 2, wherein:
 certifying the association data stored by the second asset contract comprises the second asset contract generating a certification event on the distributed ledger; and
 in response to a request for certification events, the distributed ledger is arranged to return data indicative of the certification of the association data stored by the second asset contract.

4. The system of clause 2 or 3, wherein:
the distributed ledger further comprises a control contract having an address on the distributed ledger and storing first trust level data indicative of a trust level of the first current user, and
wherein certifying the association data stored by the second asset contract comprises:
the second asset contract requesting the first trust level data from the control contract;
the control contract sending the first trust level data to the second asset contract; and
the second asset contract determining, using the first trust level data, that the first current user is permitted to certify the association data stored by the second asset contract.

5. The system of any previous clause, operable to revoke a certification of association data stored by a third asset contract of the one of more asset contracts, the association data stored by the third asset contract comprising:
an address on the distributed ledger of a third user account of the one or more user accounts;
data indicative of a third data location in the data store; and
data indicating the certification of the association data,
wherein revoking the certification of the association data stored by the third asset contract comprises:
the computing device, in response to an input from a second current user of the computing device indicating revocation of the certification of the association data stored by the third asset contract, sending a third request to the third asset contract, the third request conveying data indicating revocation of the certification of the association data stored by the third asset contract; and
the third asset contract updating, in response to receiving the third request, the association data stored by the third asset contract to indicate that the certification of the association data stored by the third asset contract is revoked.

6. The system of clause 5 dependent on clause 4, wherein the control contract stores second trust level data indicative of a trust level of the second current user, and
wherein revoking the association data stored by the third asset contract comprises:
the third asset contract requesting the second trust level data from the control contract;
the control contract sending the second trust level data to the third asset contract; and
the third asset contract determining, using the second trust level data, that the second current user is permitted to revoke the certification of the association data stored by the third asset contract.

The system of clause 5 or 6, wherein:
revoking the certification of association data stored by the second asset contract comprises the second asset contract generating a revocation event on the distributed ledger; and
in response to a request for revocation events, the distributed ledger is arranged to return data indicative of the revocation of the association data stored by the third asset contract.

8. The system of any previous clause, comprising an Identity Provider (IdP) communicatively coupled with the computing device and storing data associating user credentials with addresses of the one or more user accounts,
wherein the computing device is operable to:
receive user credentials associated with the address of the first user account; and
send the received user credentials to the IdP, and
wherein the IdP is operable to:
look up, using the user credentials sent by the computing device, the address of the first user account; and
send the address of the first user account to the computing device.

9. The system of any of clauses 4 to 8, comprising a taxonomy server communicatively coupled to the computing device and operable to store taxonomy data, the taxonomy data comprising data indicating a hierarchy for the one or more asset contracts,
wherein:
the control contract further stores asset address data indicating the addresses of the one or more asset contracts;
each of the one or more asset contracts stores asset data comprising a unique asset identifier; and
the computing device is operable to:
retrieve, from the control contract, the asset address data;
retrieve, from the taxonomy server, the taxonomy data;
retrieve, from each of the one or more asset contracts having addresses indicated by the retrieved asset address data, the asset data; and
construct, using the retrieved taxonomy data and the retrieved asset data, a catalogue of assets corresponding to the one or more asset contracts.

10. The system of any previous clause, wherein the computing device is a virtual computing device.

11. The system of any previous clause, wherein the data store comprises a distributed data store.

12. The system of any previous clause, wherein:
the plurality of computing nodes and the computing device form part of a private network; and the private network further comprises a firewall server for controlling communications with computing devices outside the private network.

13. The system of clause 12, wherein the firewall server is configured to process data received from one of the plurality of computing nodes and send the processed data to a computing device outside the private network,
wherein processing the received data comprises at least one of redacting, encrypting, and hashing the received data.

14. The system of clause 13, wherein:
the computing device is a first computing device;
the distributed ledger comprises a firewall management contract having an address on the distributed ledger and storing filter rule data associating the addresses of one or more of the plurality of user accounts with filter rules indicating processing operations; and
the firewall server is configured to:
receive, from a second computing device outside the private network, a request for data stored on the distributed ledger;
query, in response to receiving the request for data stored on the distributed ledger, the firewall management contract for filter rule data associating an address of a fourth user account with filter rules indicative of processing operations, the fourth user account being associated with a current user of the second computing device;
request data stored on the distributed ledger;
process, in response to receiving data from the distributed ledger, the received data in accordance with the indicated processing operations; and
send the processed data to the second computing device.

15. The system of clause 14, comprising a private Identity Provider (IdP) communicatively coupled with the second computing device and storing data associating user credentials with addresses of the one or more user accounts,
wherein the second computing device is operable to:
receive user credentials associated with the address of the fourth user account; and
send the received user credentials associated with the fourth user account to the private IdP, and
wherein the private IdP is operable to:
look up, using the user credentials sent by the second computing device, the address of the fourth user account; and
send the address of the fourth user account to the computing device.

16. The system of any of clauses 12 to 15, wherein the private network is a virtual private network.

17. A data processing infrastructure comprising:
a first data processing system as described in any of clauses 4 to 11, wherein the distributed ledger of the first data processing system is a first distributed ledger; and
a second data processing system as described in any of clauses 12 to 16, wherein the distributed ledger of the second data processing system is a second distributed ledger,
wherein the control contract of the first data processing system stores data identifying the second distributed ledger and is arranged to return, in response to receiving a request from a computing device, the data identifying the second distributed ledger.

18. The infrastructure of clause 17, wherein the control contract of the first data processing system is further arranged to, in response to receiving a request conveying data comprising:
an address on the first distributed ledger of a fifth user account;
an address on the second distributed ledger of a sixth user account; and
data identifying the second distributed ledger,
generate an event on the first distributed ledger, indicating an association between the address of the fifth user account and the address of the sixth user account.

19. The infrastructure of clause 18, wherein the second data processing system is as described in either of clauses 14 or 15, wherein the second computing device of the second data processing system is communicatively coupled with one of the plurality of computing nodes of the first data processing system, and is operable to receive data from the firewall server indicative of a certification of association data stored by a fourth asset contract of the one or more asset contracts on the second distributed ledger, the association data stored by the fourth asset contract comprising:
the address on the second distributed ledger of the sixth user account; and
data indicative of a fourth data location in the data store,
wherein the second computing device of the second data processing system is operable to send a fourth request to a fifth asset contract on the first distributed ledger, the fourth request conveying data comprising:
the address on the first distributed ledger of the fifth user account;
data identifying the second distributed ledger; and
an address on the second distributed ledger of the fourth asset contract, and
wherein the fifth asset contract is configured to generate, in response to receiving the fourth request, a proxy certification event on the first distributed ledger, the proxy certification event comprising:
the address on the first distributed ledger of the fifth user account;
the data identifying the second distributed ledger; and
the address on the second distributed ledger of the fourth asset contract,
wherein the first distributed ledger is arranged to return, in response to a query indicating the fifth user account, data indicative of the certification of the association data stored by the fourth asset contract.

20. An asset contract for deployment on an electronic private distributed ledger system, the asset contract arranged to store association data, the association data comprising:
an address on the distributed ledger of a user account; and
data indicative of a data location in a data store,
wherein the asset contract is operable to return, in response to a query indicating the user account, the data indicative of the data location, thereby to enable access to data stored at the data location.

21. The asset contract of clause 20, arranged to:
update, in response to receiving a request conveying data indicating certification of the data stored at the data location, the association data to indicate that an association of the user account with the data stored at the data location is certified; and
generate a certification event on the distributed ledger,
such that the distributed ledger is operable to return, in response to a request for certification events, data indicative of the certification of the association data.

22. The asset contract of clause 21, wherein the user account is a first user account, and updating the association data to indicate that the association of the user account with the data stored at the data location is certified comprises:
retrieving trust level data from a control contract on the distributed ledger, the trust level data indicating a trust level associated with a second user account; and
determining, using the trust level data, that a user associated with the second user account is permitted to certify the association data.

23. The asset contract of clause 21 or 22, arranged to:
update, in response to receiving a request conveying data indicating revocation of the certification of the data stored at the data location, the association data to indicate that the certification of the association of the user account with the data stored at the data location is revoked; and
generate a revocation event on the distributed ledger,
such that the distributed ledger is arranged to return, in response to a request for revocation events, data indicative of the revocation of the certification of the association data.

24. The asset contract of clause 23, wherein updating the association data to indicate that the certification of the association of the user account with the data stored at the data location is revoked comprises:
Retrieving further trust level data from a control contract on the distributed ledger, the trust level data indicating a trust level associated with a third user account; and
determining, using the further trust level data, that the user associated with the third user account is permitted to revoke the certification of the association data.

25. The asset contract of any of clauses 20 to 24, wherein the distributed ledger is a first distributed ledger, and wherein the asset contract is arranged to, in response to receiving a request conveying data comprising:
an address on the first distributed ledger of a seventh user account;
data identifying a second distributed ledger; and
an address on the second distributed ledger of a further asset contract,
generate a proxy certification event on the first distributed ledger, the proxy certification event comprising:

the address on the first distributed ledger of the seventh user account;
the data identifying the second distributed ledger; and
the address on the second distributed ledger of the further asset contract.

26. A control contract for deployment on electronic private distributed ledger system, arranged to:
store trust level data indicating a trust level associated with a first user account on the distributed ledger; and
send, in response to receiving a first request from an asset contract on the distributed ledger, the trust level data to the asset contract.

27. The control contract of clause 26, further arranged to:
store asset address data comprising addresses on the distributed ledger of one or more asset contracts; and
send, in response to receiving a second request from a computing device, the asset address data to the computing device.

28. The control contract of clause 26 or 27, wherein the distributed ledger is a first distributed ledger, and wherein the control contract is configured to:
receive a third request from a first computing device, the third request conveying data identifying a second distributed ledger;
store the data identifying the second distributed ledger, thereby to register the second distributed ledger; and
return, in response to receiving a fourth request from a second computing device, the data identifying the second distributed ledger.

29. The control contract of clause 28, arranged to generate, in response to receiving the third request, a registration event on the first distributed ledger.

30. The control contract of clause 28 or 29, arranged to, in response to receiving a fifth request from a third computing device, the fifth request conveying data comprising:
an address of a second user account on the first distributed ledger;
an address of a third user account on the second distributed ledger; and
data identifying the second distributed ledger,
generate an event on the first distributed ledger, indicating an association of the address of the second user account with the address of the third distributed ledger.

31. A computing node configured to host a distributed ledger and storing an asset contract as described in any of clauses 20 to 25.

32. The computing node of clause 31, storing a control contract as described in any of clauses 26 to 30.

33. A computing device communicatively coupled with a data store and with one of a plurality of computing nodes, the plurality of computing nodes configured to host a distributed ledger,
wherein the distributed ledger comprises:
a plurality of user accounts, each of the plurality of user accounts having an address on the distributed ledger; and
one or more asset contracts, each of the one or more asset contracts having an address on the distributed ledger,
wherein the computing device is operable to provide association data to a first asset contract of the one or more asset contracts, the provided association data comprising:
an address on the distributed ledger of a first user account of the plurality of user accounts; and
data indicative of a first data location in the data store.

34. The computing device of clause 33, operable to:
send a first request to a second asset contract of the one or more asset contracts, the first request conveying data indicating a second user account of the plurality of user accounts and requesting data indicative of a data location in the data store;
receive a response from the second asset contract indicating a second data location in the data store;
retrieve data from the indicated second data location for certification by a first current user of the computing device; and
in response to an input from a first current user of the computing device indicating certification of the data retrieved from the second data location, send a second request to the second asset contract, the second request conveying data indicating certification of the data retrieved from the second data location.

35. The computing device of clause 33 or 34, operable to send, in response to an input from a second current user of the computing device indicating revocation of a certification of data stored by a third asset contract, send a third request to the second asset contract, the second request conveying data indicating revocation of the certification of data stored by the third asset contract.

36. The computing device of any of clauses 33 to 35, operable to
retrieve, from a control contract stored on the distributed ledger, asset address data indicating addresses on the distributed ledger of the one or more asset contracts;
retrieve, from a taxonomy server, taxonomy data comprising data indicating a hierarchy for the one or more asset contracts;
retrieve, from each of the one or more asset contracts having addresses indicated by the retrieved asset address data, the asset data; and
construct, using the retrieved taxonomy data and the retrieved asset data, a catalogue of assets corresponding to the one or more asset contracts.

37. A computing device operable to deploy, on a distributed ledger, a control contract as described in any of clauses 26 to 30, and one or more asset contracts as described in any of clauses 20 to 25.

38. A firewall server configured to:
receive, from a computing device, a request for data stored on a private distributed ledger;
query, in response to receiving the request for data stored on the private distributed ledger, a firewall management contract for filter rule data associating an address of a user account with filter rules indicative of processing operations, wherein the user account is associated with a current user of the computing device;
request data stored on the private distributed ledger;
in response to receiving data stored on the private distributed ledger, process the received data in accordance with the indicated processing operations; and
send the processed received data to the computing device
wherein processing the received data comprises at least one of redacting, rewriting, encrypting, and hashing the received data.

39. A firewall management contract for deployment on an electronic private distributed ledger system, the firewall management contract arranged to store filter rule data associating addresses of user accounts on the private distributed ledger with filter rules indicating processing operations,
wherein the firewall management contract is arranged to send to a firewall server, in response to a query from the firewall server indicating an address of a user account on the private distributed ledger, filter rule data associating the address of the user account with filter rules indicating processing operations.

What is claimed is:

1. A data processing system comprising:
   a plurality of computing nodes configured to host a distributed ledger;
   a computing device communicatively coupled with one of the computing nodes; and
   a data store communicatively coupled with the computing device,
   wherein the distributed ledger comprises:
      a plurality of user accounts, each of the plurality of user accounts having an address on the distributed ledger; and
      one or more asset contracts, each of the one or more asset contracts having an address on the distributed ledger,
   wherein the computing device is operable to provide association data to a first asset contract of the one or more asset contracts, the provided association data comprising:
      an address on the distributed ledger of a first user account of the plurality of user accounts; and
      data indicative of a first data location in the data store, and
   wherein the first asset contract is arranged to:
      store the provided association data; and
      in response to a query indicating the first user account, return the data indicative of the first data location, thereby to enable access to data stored at the first data location.

2. The system of claim 1, operable to certify association data stored by a second asset contract of the one of more asset contracts, the association data stored by the second asset contract comprising:
   an address on the distributed ledger of a second user account of the one or more user accounts; and
   data indicative of a second data location in the data store,
      wherein certifying the association data stored by the second asset contract comprises the computing device:
   sending a first request to the second asset contract for the data indicative of the second data location, the first request conveying data indicating the second user account;
   retrieving data from the indicated second data location for certification by a current user of the computing device; and
   in response to an input from the current user indicating certification of the data retrieved from the second data location, sending a second request to the second asset contract, the second request conveying data indicating certification of the data retrieved from the second data location, and
   wherein certifying the association data stored by the second asset contract further comprises the second asset contract updating, in response to receiving the second request, the association data stored by the second asset contract to indicate that an association of the second user account with data stored at the second data location is certified.

3. The system of claim 2, wherein:
   certifying the association data stored by the second asset contract comprises the second asset contract generating a certification event on the distributed ledger; and
   in response to a request for certification events, the distributed ledger is arranged to return data indicative of the certification of the association data stored by the second asset contract.

4. The system of claim 2, wherein:
   the distributed ledger further comprises a control contract having an address on the distributed ledger and storing trust level data indicative of a trust level of the current user; and
   certifying the association data stored by the second asset contract comprises:
      the second asset contract requesting the trust level data from the control contract;
      the control contract sending the trust level data to the second asset contract; and
      the second asset contract determining, using the trust level data, that the current user is permitted to certify the association data stored by the second asset contract.

5. The system of claim 1, operable to revoke a certification of association data stored by a second asset contract of the one of more asset contracts, the association data stored by the second asset contract comprising:
   an address on the distributed ledger of a second user account of the one or more user accounts;
   data indicative of a second data location in the data store; and
   data indicating the certification of the association data,
   wherein revoking the certification of the association data stored by the second asset contract comprises:
      the computing device, in response to an input from a current user of the computing device indicating revocation of the certification of the association data stored by the second asset contract, sending a request to the second asset contract, the request conveying data indicating revocation of the certification of the association data stored by the second asset contract; and
      the second asset contract updating, in response to receiving the request, the association data stored by the second asset contract to indicate that the certification of the association data stored by the second asset contract is revoked.

6. The system of claim 5, wherein:
   the distributed ledger further comprises a control contract having an address on the distributed ledger and storing trust level data indicative of a trust level of the current user of the computing device; and
   revoking the association data stored by the second asset contract comprises:
      the second asset contract requesting the trust level data from the control contract;
      the control contract sending the trust level data to the second asset contract; and
      the second asset contract determining, using the trust level data, that the current user is permitted to revoke the certification of the association data stored by the second asset contract.

7. The system of claim 5, wherein:
   revoking the certification of association data stored by the second asset contract comprises the second asset contract generating a revocation event on the distributed ledger; and
   in response to a request for revocation events, the distributed ledger is arranged to return data indicative of the revocation of the association data stored by the second asset contract.

8. The system of claim 1, comprising:
   a taxonomy server communicatively coupled to the computing device and operable to store taxonomy data, the taxonomy data comprising data indicating a hierarchy for the one or more asset contracts, wherein:

the distributed ledger further comprises a control contract having an address on the distributed ledger and storing asset address data indicating addresses on the distributed ledger of the one or more asset contracts;

each of the one or more asset contracts stores asset data comprising a unique asset identifier; and the computing device is operable to:

retrieve, from the control contract, the asset address data;

retrieve, from the taxonomy server, the taxonomy data;

retrieve, from each of the one or more asset contracts having addresses on the distributed ledger indicated by the retrieved asset address data, the asset data; and construct, using the retrieved taxonomy data and the retrieved asset data, a catalogue of assets corresponding to the one or more asset contracts.

9. The system of claim 1, wherein:

the plurality of computing nodes and the computing device form part of a private network; and the private network further comprises a firewall server for controlling communications with computing devices outside the private network.

10. The system of claim 9, wherein the firewall server is configured to process data received from one of the plurality of computing nodes and send the processed data to a computing device outside the private network, wherein processing the received data comprises at least one of redacting, encrypting, and hashing the received data.

11. The system of claim 10, wherein:

the computing device is a first computing device;

the distributed ledger comprises a firewall management contract having an address on the distributed ledger and storing filter rule data associating addresses of one or more of the plurality of user accounts with filter rules indicating processing operations; and the firewall server is configured to:

receive, from a second computing device outside the private network, a request for data stored on the distributed ledger;

query, in response to receiving the request for data stored on the distributed ledger, the firewall management contract for filter rule data associating an address of a second user account with filter rules indicative of processing operations, the second user account being associated with a current user of the second computing device;

request data stored on the distributed ledger;

process, in response to receiving data from the distributed ledger, the received data in accordance with the indicated processing operations; and send the processed data to the second computing device.

12. The system of claim 11, comprising a private Identity Provider (IdP) communicatively coupled with the second computing device and storing data associating user credentials with addresses of the one or more user accounts, wherein the second computing device is operable to:

receive user credentials associated with the address of the second user account; and send the received user credentials associated with the second user account to the private IdP, and wherein the private IdP is operable to:

look up, using the user credentials sent by the second computing device, the address of the second user account; and send the address of the second user account to the computing device.

13. The system of claim 9, wherein the private network is a virtual private network.

14. The system of claim 1, wherein the distributed ledger is a blockchain.

15. The system of claim 1, wherein the data store comprises a distributed data store.

16. The system of claim 1, wherein the computing device is a virtual application server.

* * * * *